US012433811B2

(12) United States Patent
DuBois et al.

(10) Patent No.: US 12,433,811 B2
(45) **Date of Patent: *Oct. 7, 2025**

(54) PERSON SUPPORT APPARATUSES FOR SUBJECT REPOSITIONING

(71) Applicant: ALLEN MEDICAL SYSTEMS, INC., Batesville, IN (US)

(72) Inventors: Christopher Bennett DuBois, Marlborough, MA (US); Ben Hertz, Acton, MA (US); Timothy Allen Lane, Shrewsbury, MA (US); Rachel L. Willliamson, Batesville, IN (US); Kiana Mathews Dezelon, Cary, NC (US); Nicholas Mann, Cincinnati, OH (US); Varad Narayan Srivastava, Loveland, OH (US)

(73) Assignee: ALLEN MEDICAL SYSTEMS, INC.

( * ) Notice: Subject to any disclaimer, the term of this patent is extended or adjusted under 35 U.S.C. 154(b) by 232 days.

This patent is subject to a terminal disclaimer.

(21) Appl. No.: 18/194,933

(22) Filed: Apr. 3, 2023

(65) Prior Publication Data

US 2023/0293373 A1 Sep. 21, 2023

Related U.S. Application Data

(60) Continuation of application No. 17/089,358, filed on Nov. 4, 2020, now Pat. No. 11,642,269, which is a (Continued)

(51) Int. Cl.

| | |
|---|---|
| *A61G 13/08* | (2006.01) |
| *A61G 13/00* | (2006.01) |

(Continued)

(52) U.S. Cl.

CPC ......... *A61G 13/08* (2013.01); *A61G 13/0036* (2013.01); *A61G 13/02* (2013.01);

(Continued)

(58) Field of Classification Search

CPC .......... A61G 13/0054; A61G 2200/325; A61G 13/04; A61G 13/08; A61G 13/122;

(Continued)

(56) References Cited

U.S. PATENT DOCUMENTS

| | | | |
|---|---|---|---|
| 1,021,335 | A | 3/1912 | Robinson et al. |
| 1,160,451 | A | 11/1915 | Sanford |

(Continued)

FOREIGN PATENT DOCUMENTS

| | | | |
|---|---|---|---|
| DE | 1162508 | B | 2/1964 |
| DE | 4039907 | A1 | 7/1991 |

(Continued)

*Primary Examiner* — Madison Emanski

(74) *Attorney, Agent, or Firm* — Dinsmore & Shohl LLP

(57) ABSTRACT

Support pad assemblies and person support apparatuses are disclosed. A person support apparatus includes a base frame, a longitudinal frame coupled to the base frame, and a support deck supported on the longitudinal frame. The longitudinal frame extends in a longitudinal direction and the support deck is adjustable from a planar configuration to a concave configuration or a convex configuration.

20 Claims, 29 Drawing Sheets

Related U.S. Application Data division of application No. 15/349,680, filed on Nov. 11, 2016, now Pat. No. 10,857,054.

(60) Provisional application No. 62/254,991, filed on Nov. 13, 2015.

(51) Int. Cl.
*A61G 13/02* (2006.01)
*A61G 13/10* (2006.01)
*A61G 13/12* (2006.01)

(52) U.S. Cl.
CPC ....... *A61G 13/101* (2013.01); *A61G 13/1205* (2013.01); *A61G 13/1265* (2013.01); *A61G 13/128* (2013.01); *A61G 13/1295* (2013.01); *A61G 2210/50* (2013.01)

(58) Field of Classification Search
CPC ................ A61G 13/123; A61G 13/121; A61G 13/1245; A61G 13/0036; A61G 13/12; A61G 13/06; A61G 13/1235; A61G 2210/50; A61G 13/02; A61G 13/101; A61G 13/1205; A61G 13/1265; A61G 13/128; A61G 13/1295; A61G 13/009; A61G 13/1225; A61G 13/1285; A61G 7/001; A61G 7/018; A61G 7/008; A61G 7/015; A61G 2203/42; A61G 2203/72; A61G 7/00; A61G 7/012; A61G 7/05; A61G 7/05769; A61G 13/1255; A61H 2201/1246; A61H 2201/0142; A61H 1/0292; A61H 1/029; A47C 19/045; A47C 17/80; A47C 17/86; Y10S 5/942; A47B 91/16; A47B 9/20
USPC ... 5/613, 607, 621, 624, 610, 611, 608, 601, 5/618, 623, 6, 600, 691, 713, 118, 11; 128/845
See application file for complete search history.

(56) References Cited

U.S. PATENT DOCUMENTS

| | | | | |
|---|---|---|---|---|
| 1,171,713 | A | 2/1916 | Gilkerson | |
| 1,528,835 | A | 3/1925 | McCollough | |
| 1,799,692 | A | 4/1931 | Knott | |
| 1,938,006 | A | 12/1933 | Blanchard | |
| 2,188,592 | A | 1/1940 | Cunningham | |
| 2,613,371 | A | 10/1952 | Keyes, Jr. | |
| 2,636,793 | A | 4/1953 | Meyer | |
| 2,764,150 | A | 9/1956 | Ettinger et al. | |
| 3,046,071 | A | 7/1962 | Shampaine et al. | |
| 3,049,726 | A | 8/1962 | Getz | |
| 3,090,381 | A | 5/1963 | Watson | |
| 3,226,734 | A | 1/1966 | Coventon | |
| 3,238,539 | A | 3/1966 | Koch | |
| 3,281,141 | A | 10/1966 | Smiley et al. | |
| 3,286,707 | A | 11/1966 | Shafer | |
| 3,302,218 | A | 2/1967 | Stryker | |
| 3,428,307 | A | 2/1969 | Hunter et al. | |
| 3,434,165 | A | 3/1969 | Keane | |
| 3,584,321 | A | 6/1971 | Buchanan | |
| 3,739,406 | A | 6/1973 | Koetter | |
| 3,766,384 | A | 10/1973 | Anderson | |
| 3,795,018 | A | 3/1974 | Broaded | |
| 3,814,414 | A | 6/1974 | Chapa | |
| 3,827,089 | A | 8/1974 | Grow | |
| 3,873,081 | A | 3/1975 | Smith et al. | |
| 3,895,403 | A | 7/1975 | Davis et al. | |
| 3,988,790 | A | 11/1976 | Mracek et al. | |
| 4,101,120 | A | 7/1978 | Seshima | |
| 4,144,880 | A | 3/1979 | Daniels | |
| 4,175,550 | A | 11/1979 | Leininger et al. | |
| 4,186,917 | A | 2/1980 | Rais et al. | |
| 4,227,269 | A | 10/1980 | Johnston | |
| 4,384,378 | A | 5/1983 | Getz et al. | |
| 4,398,707 | A | 8/1983 | Cloward | |
| 4,503,844 | A | 3/1985 | Siczek | |
| 4,579,111 | A | 4/1986 | Ledesma | |
| 4,658,450 | A | 4/1987 | Thompson | |
| 4,658,451 | A * | 4/1987 | Taniguchi | A61G 7/1015 5/942 |
| 4,712,781 | A | 12/1987 | Watanabe | |
| 4,827,541 | A | 5/1989 | Vollman | |
| 4,840,362 | A | 6/1989 | Bremer et al. | |
| 4,856,128 | A | 8/1989 | Alsip et al. | |
| 4,866,796 | A | 9/1989 | Robinson et al. | |
| 4,868,937 | A | 9/1989 | Connolly | |
| 4,924,537 | A | 5/1990 | Alsip et al. | |
| 4,944,054 | A | 7/1990 | Bossert | |
| 4,947,496 | A | 8/1990 | Connolly | |
| 4,953,245 | A | 9/1990 | Jung | |
| 4,970,737 | A | 11/1990 | Sagel | |
| 5,020,170 | A | 6/1991 | Ruf | |
| 5,088,706 | A | 2/1992 | Jackson | |
| 5,131,106 | A | 7/1992 | Jackson | |
| 5,152,024 | A | 10/1992 | Chrones | |
| 5,224,228 | A | 7/1993 | Larrimore | |
| 5,231,741 | A | 8/1993 | Maguire | |
| 5,239,716 | A | 8/1993 | Fisk | |
| 5,333,334 | A | 8/1994 | Kassai | |
| 5,444,882 | A | 8/1995 | Andrews et al. | |
| 5,461,740 | A | 10/1995 | Pearson | |
| 5,487,195 | A | 1/1996 | Ray | |
| 5,502,853 | A | 4/1996 | Singleton et al. | |
| 5,613,254 | A | 3/1997 | Clayman et al. | |
| 5,658,315 | A | 8/1997 | Lamb et al. | |
| 6,003,174 | A | 12/1999 | Kantrowitz et al. | |
| 6,049,923 | A | 4/2000 | Ochiai | |
| 6,076,525 | A | 6/2000 | Hoffman | |
| 6,094,760 | A | 8/2000 | Nonaka et al. | |
| 6,108,838 | A | 8/2000 | Connolly et al. | |
| 6,112,349 | A | 9/2000 | Connolly | |
| 6,154,901 | A | 12/2000 | Carr | |
| 6,260,220 | B1 * | 7/2001 | Lamb | A61G 13/12 5/607 |
| 6,282,736 | B1 | 9/2001 | Hand et al. | |
| 6,286,164 | B1 | 9/2001 | Lamb et al. | |
| 6,324,710 | B1 | 12/2001 | Hernandez et al. | |
| 6,421,854 | B1 | 7/2002 | Heimbrock | |
| 6,438,777 | B1 | 8/2002 | Bender | |
| 6,499,158 | B1 | 12/2002 | Easterling | |
| 6,499,160 | B2 | 12/2002 | Hand et al. | |
| 6,505,365 | B1 | 1/2003 | Hanson et al. | |
| 6,523,197 | B2 | 2/2003 | Zitzmann | |
| 6,526,610 | B1 | 3/2003 | Hand et al. | |
| 6,609,260 | B2 | 8/2003 | Hand et al. | |
| 6,615,430 | B2 | 9/2003 | Heimbrock | |
| 6,622,324 | B2 | 9/2003 | VanSteenburg et al. | |
| 6,634,043 | B2 | 10/2003 | Lamb et al. | |
| 6,638,299 | B2 | 10/2003 | Cox | |
| 6,662,388 | B2 | 12/2003 | Friel et al. | |
| 6,668,396 | B2 | 12/2003 | Wei | |
| 6,671,904 | B2 | 1/2004 | Easterling | |
| 6,681,423 | B2 | 1/2004 | Zachrisson | |
| 6,691,347 | B2 | 2/2004 | Hand et al. | |
| 6,701,553 | B1 | 3/2004 | Hand et al. | |
| 6,721,976 | B2 | 4/2004 | Schwaegerle | |
| 6,817,363 | B2 | 11/2004 | Biondo et al. | |
| 6,854,137 | B2 | 2/2005 | Johnson | |
| 6,857,144 | B1 | 2/2005 | Huang | |
| 6,859,967 | B2 | 3/2005 | Harrison et al. | |
| 6,862,759 | B2 | 3/2005 | Hand et al. | |
| 6,862,761 | B2 | 3/2005 | Hand et al. | |
| 6,874,181 | B1 | 4/2005 | Vijayendran | |
| 6,886,199 | B1 | 5/2005 | Schwaegerle | |
| 6,912,959 | B2 | 7/2005 | Kolody et al. | |
| 6,941,951 | B2 | 9/2005 | Hubert et al. | |
| 6,966,081 | B1 | 11/2005 | Sharps et al. | |
| 6,986,179 | B2 | 1/2006 | Varadharajulu et al. | |
| 7,020,917 | B1 | 4/2006 | Kolody et al. | |
| 7,089,612 | B2 | 8/2006 | Rocher et al. | |

(56) References Cited

U.S. PATENT DOCUMENTS

| | | | |
|---|---|---|---|
| 7,137,160 | B2 | 11/2006 | Hand et al. |
| 7,152,261 | B2 | 12/2006 | Jackson |
| 7,197,778 | B2 | 4/2007 | Sharps |
| 7,216,385 | B2 | 5/2007 | Hill |
| 7,234,180 | B2 | 6/2007 | Horton et al. |
| 7,343,635 | B2 | 3/2008 | Jackson |
| 7,441,290 | B1 | 10/2008 | Flick |
| 7,520,007 | B2 | 4/2009 | Skripps |
| 7,565,708 | B2 | 7/2009 | Jackson |
| 7,572,239 | B1 | 8/2009 | Brotz |
| 7,600,281 | B2 | 10/2009 | Skripps |
| 7,669,262 | B2 | 3/2010 | Skripps et al. |
| 7,681,269 | B2 | 3/2010 | Biggie et al. |
| 7,739,762 | B2 | 6/2010 | Lamb et al. |
| 7,810,185 | B2 | 10/2010 | Burstner et al. |
| 8,042,208 | B2 | 10/2011 | Gilbert et al. |
| 8,056,163 | B2 | 11/2011 | Lemire et al. |
| 8,060,960 | B2 | 11/2011 | Jackson |
| 8,234,730 | B2 | 8/2012 | Skripps |
| 8,286,283 | B2 | 10/2012 | Copeland et al. |
| 8,381,331 | B2 | 2/2013 | Sharps et al. |
| 8,584,281 | B2 | 11/2013 | Diel et al. |
| 8,635,725 | B2 | 1/2014 | Tannoury et al. |
| 8,677,529 | B2 | 3/2014 | Jackson |
| 8,707,476 | B2 | 4/2014 | Sharps |
| 8,707,484 | B2 | 4/2014 | Jackson et al. |
| 8,719,979 | B2 | 5/2014 | Jackson |
| 8,763,178 | B1 | 7/2014 | Martin et al. |
| 8,782,832 | B2 | 7/2014 | Blyakher et al. |
| 8,826,475 | B2 | 9/2014 | Jackson |
| 8,839,471 | B2 | 9/2014 | Jackson |
| 8,844,077 | B2 | 9/2014 | Jackson et al. |
| 8,856,986 | B2 | 10/2014 | Jackson |
| 8,938,826 | B2 | 1/2015 | Jackson |
| 9,744,087 | B2 | 8/2017 | Jackson |
| 9,775,765 | B2 | 10/2017 | Grigoreva |
| 10,136,863 | B2 | 11/2018 | Kaiser et al. |
| 2004/0133983 | A1 | 7/2004 | Newkirk et al. |
| 2006/0123552 | A1 | 6/2006 | Ben-Levi |
| 2006/0248650 | A1 | 11/2006 | Skripps |
| 2006/0255220 | A1 | 11/2006 | Skripps |
| 2008/0000028 | A1 | 1/2008 | Lemire et al. |
| 2009/0000614 | A1 | 1/2009 | Carrano |
| 2009/0126116 | A1 | 5/2009 | Lamb et al. |
| 2009/0205139 | A1 | 8/2009 | Van Deursen et al. |
| 2009/0282614 | A1 | 11/2009 | Jackson |
| 2010/0192300 | A1 | 8/2010 | Tannoury et al. |
| 2011/0107516 | A1 | 5/2011 | Jackson et al. |
| 2011/0213503 | A1 | 9/2011 | Porter, III |
| 2012/0198625 | A1 | 8/2012 | Jackson |
| 2013/0111666 | A1 | 5/2013 | Jackson |
| 2013/0205500 | A1 | 8/2013 | Jackson |
| 2013/0219623 | A1* | 8/2013 | Jackson ............. A61G 13/0036 5/613 |
| 2013/0239331 | A1 | 9/2013 | Eaton et al. |
| 2013/0254995 | A1 | 10/2013 | Jackson |
| 2013/0254996 | A1 | 10/2013 | Jackson |
| 2013/0254997 | A1 | 10/2013 | Jackson |
| 2013/0312181 | A1 | 11/2013 | Jackson et al. |
| 2013/0312187 | A1 | 11/2013 | Jackson |
| 2013/0312188 | A1 | 11/2013 | Jackson |
| 2013/0326813 | A1 | 12/2013 | Jackson |
| 2014/0007349 | A1 | 1/2014 | Jackson |
| 2014/0020181 | A1 | 1/2014 | Jackson |
| 2014/0033436 | A1 | 2/2014 | Jackson |
| 2014/0068861 | A1 | 3/2014 | Jackson et al. |
| 2014/0082842 | A1 | 3/2014 | Jackson |
| 2014/0109316 | A1 | 4/2014 | Jackson et al. |
| 2014/0173826 | A1 | 6/2014 | Jackson |
| 2014/0196212 | A1 | 7/2014 | Jackson |
| 2014/0201913 | A1 | 7/2014 | Jackson |
| 2014/0201914 | A1 | 7/2014 | Jackson |
| 2014/0208512 | A1 | 7/2014 | Jackson |
| 2014/0317847 | A1 | 10/2014 | Jackson |
| 2015/0059094 | A1 | 3/2015 | Jackson |
| 2015/0150743 | A1 | 6/2015 | Jackson |
| 2015/0375865 | A1 | 12/2015 | Fischer et al. |
| 2016/0000627 | A1 | 1/2016 | Jackson et al. |
| 2017/0000673 | A1 | 1/2017 | Harmeyer et al. |
| 2017/0252250 | A1 | 9/2017 | Gabbay et al. |

FOREIGN PATENT DOCUMENTS

| | | | |
|---|---|---|---|
| DE | 4429062 | A1 | 2/1996 |
| DE | 19723927 | A1 | 12/1998 |
| DE | 10158470 | A1 | 6/2003 |
| EP | 0617947 | B1 | 1/1995 |
| GB | 2210554 | B | 9/1989 |
| JP | 2001112582 | A | 4/2011 |
| WO | 8500967 | A1 | 3/1985 |
| WO | 0117476 | A1 | 3/2001 |
| WO | 03096958 | A1 | 11/2003 |
| WO | 2004026212 | A1 | 4/2004 |

* cited by examiner

PERSON SUPPORT APPARATUSES FOR SUBJECT REPOSITIONING

CROSS-REFERENCE TO RELATED APPLICATION

The present application is a continuation of U.S. patent application Ser. No. 17/089,358, entitled "Person Support Apparatuses for Subject Repositioning" and filed Nov. 4, 2020, which is a divisional of U.S. patent application Ser. No. 15/349,680, entitled "Person Support Apparatuses for Subject Repositioning" and filed Nov. 11, 2016, which claims priority to U.S. Provisional Patent Application Ser. No. 62/254,991, filed Nov. 13, 2015 and entitled "Person Support Apparatuses For Subject Repositioning," the entire contents of all are incorporated herein by reference.

BACKGROUND

Field

The present specification generally relates to person support apparatuses and, more specifically, to person support apparatuses including subject repositioning assemblies.

Technical Background

In some medical situations it may be necessary to reposition a subject between various positions. For example, a surgical procedure may require that a subject is initially oriented in a prone position and may subsequently require that the subject be repositioned to lie on his or her side, or vice versa. Alternatively, it may be desirable to orient and retain the subject in a particular position in order to facilitate a medical procedure. A common technique in conventional practice is to summon as many colleagues as practical to lift and maneuver the subject between the various positions. The risk of mishandling the subject makes this technique undesirable. Furthermore, such techniques may not result in the subject being retained in the desired position.

Accordingly, a need exists for alternative person support apparatuses that include person repositioning assemblies.

SUMMARY

In one embodiment, a person support apparatus includes a base frame, a longitudinal frame coupled to the base frame and extending in a longitudinal direction, and a support deck supported on the longitudinal frame. The support deck is adjustable from a planar configuration to a concave configuration or a convex configuration.

In another embodiment, a support pad apparatus includes a base frame, a longitudinal frame supported by the base frame and extending in a longitudinal direction, and a support pad assembly supported on the longitudinal frame. The support pad assembly includes one or more clamps that couple to the person support apparatus, where each clamp includes at least one actuator. The support pad assembly further includes a support pad coupled to the at least one actuator. The at least one actuator raises and lowers the support pad with respect to the longitudinal frame.

In yet another embodiment, a person support apparatus includes a base frame, a longitudinal frame supported by the base frame, a plurality of support pads supported on the longitudinal frame, and a means for adjusting a position of at least one of the plurality of support pads relative to the longitudinal frame. The longitudinal frame extends in a longitudinal direction.

In yet another embodiment, a support pad assembly for a person support apparatus includes one or more clamps that couple to the person support apparatus, where each one of the one or more clamps includes at least one actuator. The support pad assembly further includes a support pad coupled to the at least one actuator. The at least one actuator changes a position of the support pad relative to the plurality of clamps.

In yet another embodiment, a person support apparatus includes a base frame, a plurality of bladders supported by the base frame, a fluid source coupled to each one of the plurality of bladders, and an electronic controller communicatively coupled to the fluid source. The electronic controller includes a processor and a non-transitory memory storing computer readable and executable instructions which, when executed by the processor, cause the processor to receive one or more inputs corresponding to at least one of a desired subject positioning and a desired pressure to be placed on at least a portion of a subject's body, determine a pressure for each of the plurality of bladders that corresponds to the received one or more inputs, and direct a fluid from the fluid source to be added to or removed from each one of the plurality of bladders based upon the determined pressure.

In yet another embodiment, a person support apparatus includes a base frame and a plurality of bladders arranged in a layered configuration and supported by the base frame. The fluid pressure of each one of the plurality of bladders is adjustable.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 12A-2 schematically depicts a detailed cross-sectional view of the position of the plurality of support pads in FIG. 12A-1 according to one or more embodiments shown or described herein;

FIG. 12B-1 schematically depicts a detailed perspective view of another position of a plurality of support pads according to one or more embodiments shown or described herein;

FIG. 12B-2 schematically depicts a detailed cross-sectional view of the position of the plurality of support pads in FIG. 12B-1 according to one or more embodiments shown or described herein;

FIG. 12C-1 schematically depicts a detailed perspective view of yet another position of a plurality of support pads according to one or more embodiments shown or described herein;

FIG. 12C-2 schematically depicts a detailed cross-sectional view of the position of the plurality of support pads in FIG. 12C-1 according to one or more embodiments shown or described herein;

FIG. 12D-1 schematically depicts a detailed perspective view of yet another position of a plurality of support pads according to one or more embodiments shown or described herein;

FIG. 12D-2 schematically depicts a detailed cross-sectional view of the position of the plurality of support pads in FIG. 12D-1 according to one or more embodiments shown or described herein;

DETAILED DESCRIPTION

Figure 1A:
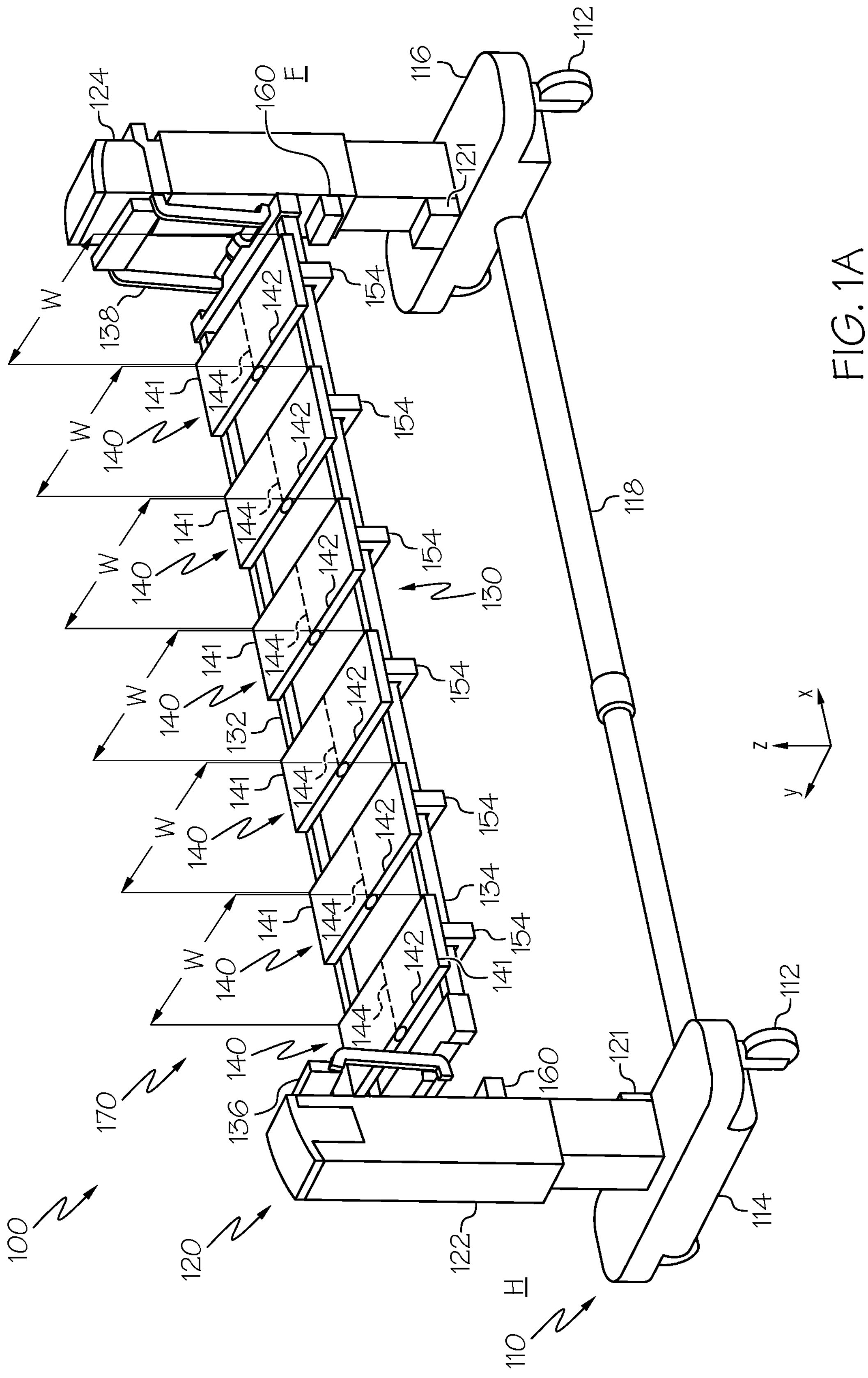
FIG. 1A schematically depicts a person support apparatus having a support deck with a plurality of support pads according to one or more embodiments shown or described herein.
Figure 1B:
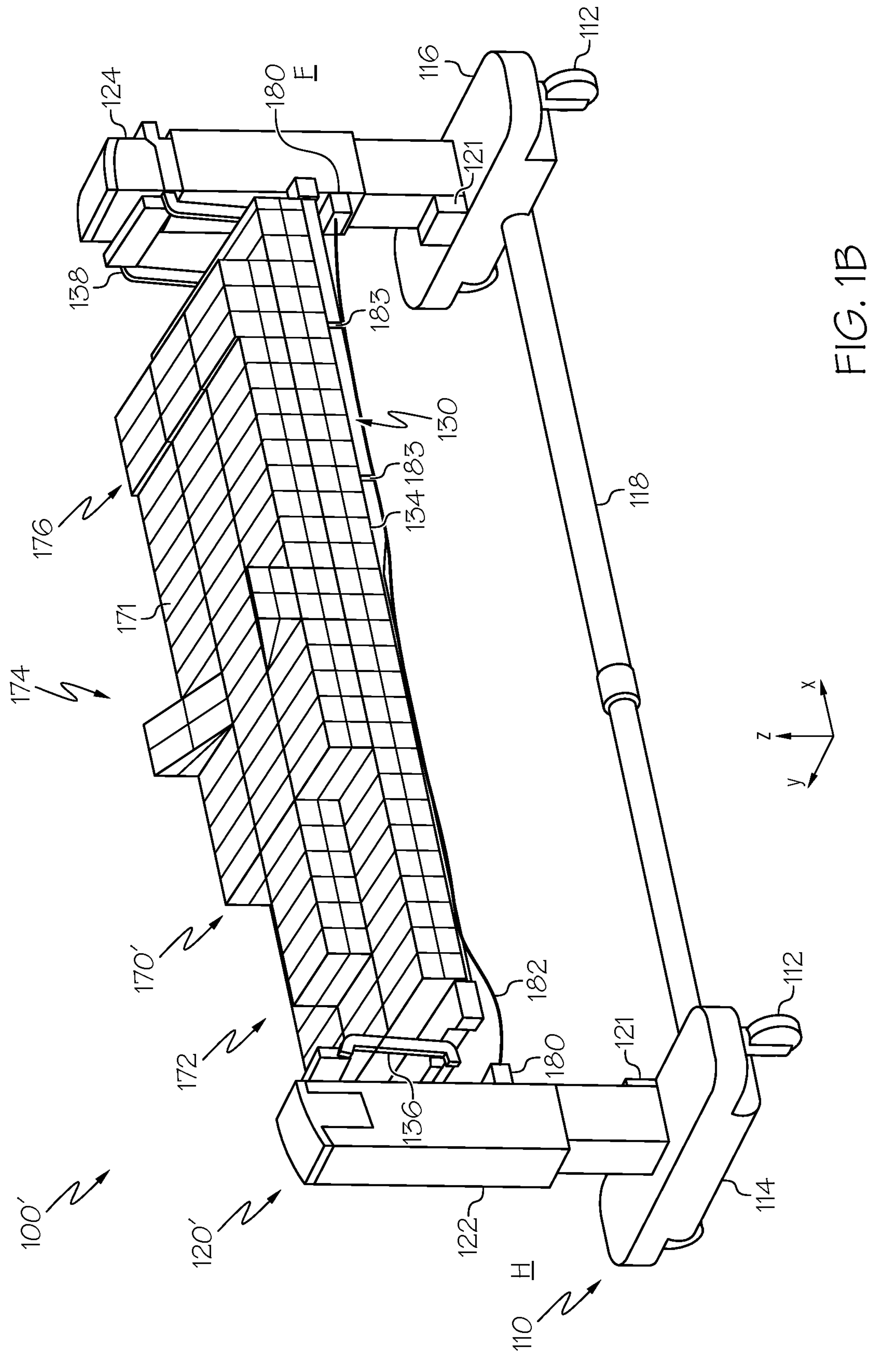
FIG. 1B schematically depicts a person support apparatus having a support deck with inflatable bladders according to one or more embodiments shown or described herein.
Figures 1, 12A:
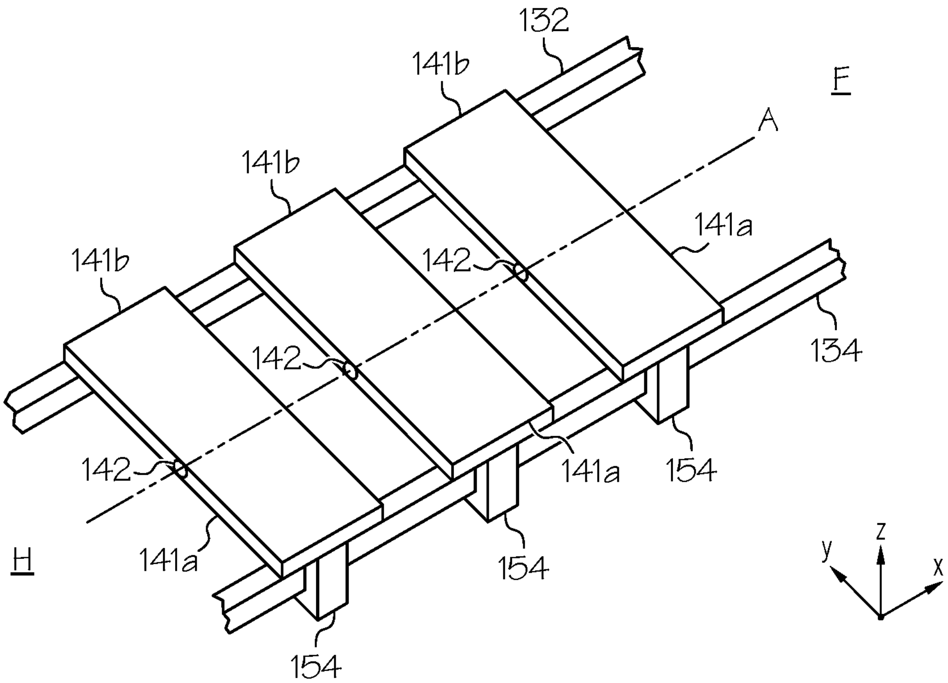
FIG. 12A-1 schematically depicts a detailed perspective view of a position of a plurality of support pads according to one or more embodiments shown or described herein.
Figures 2, 12A:
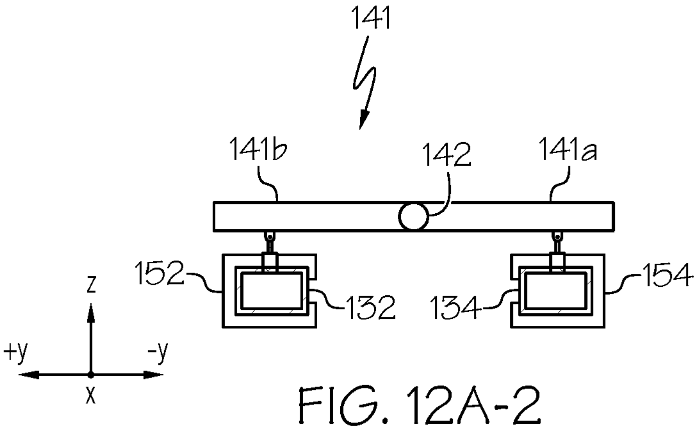

Reference will now be made in detail to embodiments of person support apparatuses that include person repositioning assemblies, examples of which are illustrated in the accompanying drawings. Whenever possible, the same reference numerals will be used throughout the drawings to refer to the same or like parts. Embodiments of a person support apparatus are depicted in FIGS. 1A and 1B. The person support apparatus generally includes a base frame and a primary support frame supported on the base frame, where the primary support frame extends in a longitudinal direction. The person support apparatus further includes a support deck coupled to the primary support frame. The support deck includes either one or more support pad assemblies comprising a support pad supported by the primary support frame (FIG. 1A) or a plurality of bladders supported by the primary support frame (FIG. 1). In embodiments where the support deck includes one or more support pad assemblies, the support pad can be raised and lowered via one or more actuators coupled between the support pad and the primary support frame, where the one or more actuators allow the support pad to be adjusted to varying heights with respect to each other, and further allow various sections of the support pad to adjust to varying heights with respect to other sections of the same support pad. In embodiments where the support deck includes a plurality of bladders, the bladders may be arranged in a stacked or layered configuration. In addition, each one of the plurality of bladders are adjustable (e.g., individually inflatable or deflatable to a particular pressure). Inflation and deflation of each of the bladders allows the support deck to be adjusted to varying heights to facilitate positioning a of subject to a desired position. Various embodiments of person support apparatuses will be described herein with specific reference to the appended drawings.

The person support apparatuses described herein allow for a subject situated thereon to be moved, adjusted, and/or positioned without requiring a user (such as operating room personnel) to breach the sterile field to complete the movements, adjustments, and/or positions or to potentially mishandle the subject. Rather, the person support apparatuses described herein may be electronically controlled to complete the movements, adjustments, and/or positions that are necessary. In addition, use of such an electronic controller may result in a more accurate and repeatable positioning of the subject.

As used herein, the term "longitudinal direction" refers to the forward-rearward direction of the person support apparatus (i.e., in the +/−X-directions of the coordinate axes depicted). The term "lateral direction" refers to the cross-direction of the person support apparatus (i.e., in the +/−Y-directions of the coordinate axes depicted), and is transverse to the longitudinal direction. The term "vertical direction" refers to the upward-downward direction of the person support apparatus (i.e., in the +/−Z-directions of the coordinate axes depicted), and is transverse to the lateral and the longitudinal directions. The terms "head end" and "foot end" refer to the relative location of components of the person support apparatus in the longitudinal direction.

The phrase "communicatively coupled" is used herein to describe the interconnectivity of various components of the person support apparatus and means that the components are connected either through wires, optical fibers, or wirelessly such that electrical, optical, and/or electromagnetic signals may be exchanged between the components.

A "fluid" as used herein generally refers to any fluid that can be pumped, compressed, and/or decompressed to inflate or deflate one or more bladders. While the present disclosure relates generally to gaseous fluids such as air, it should be understood that any fluid may be used without departing from the scope of the present disclosure.

Referring to FIGS. 1A and 1B, a person support apparatus 100 is depicted. The person support apparatus 100 may be, for example, a two-column operating table. The person support apparatus 100 generally includes a base frame 110, a longitudinal frame 130 supported on the base frame 110, and a primary support frame 120 coupled to the longitudinal frame 130. The primary support frame 120 may generally support a support deck 170 thereon. In the embodiment depicted in FIG. 1A, the support deck 170 may include one or more support pad assemblies 140, each support pad assembly 140 having a support pad 141 coupled to the longitudinal frame 130. In the embodiment depicted in FIG. 1B, a support deck 170' may include a plurality of bladders 171 supported by the longitudinal frame 130.

Referring to FIGS. 1A and 1B, the base frame 110 of either person support apparatus 100, 100' includes a head portion 114 positioned at a head end H of the person support apparatus 100, 100' and a foot portion 116 positioned at a foot end F of the person support apparatus 100, 100'. The head portion 114 and the foot portion 116 are spaced apart from one another in a longitudinal direction (i.e., generally along the X axis) and may be coupled to one another by a central portion 118 that extends between the head portion 114 and the foot portion 116 in the longitudinal direction. The central portion 118 may be extendable and retractable in the longitudinal direction, thereby increasing or decreasing the distance between the head portion 114 and the foot portion 116 in the longitudinal direction. In some embodiments, the head portion 114 and the foot portion 116 each have a plurality of casters 112 coupled thereto, such that the person support apparatus 100, 100' may be moved along a surface, such as a floor.

The primary support frame 120 extends upward in a vertical direction (i.e., generally along the Z axis) from the base frame 110 of the person support apparatus 100, 100'. In the embodiments depicted in FIGS. 1A and 1B, the primary support frame 120 includes a head column 122 that extends upward from the head portion 114 of the base frame 110 in the vertical direction. The primary support frame 120 further includes a foot column 124 that extends upward from the foot portion 116 of the base frame 110 in the vertical direction. Accordingly, it should be understood that the head column 122 is generally positioned proximate the head end H of the person support apparatus 100, 100' and the foot column 124 is generally positioned proximate the foot end F of the person support apparatus 100, 100'. The head column 122 is spaced apart from the foot column 124 in the longitudinal direction by the central portion 118. In some embodiments, the head column 122 and the foot column 124 are coupled to the head portion 114 and the foot portion 116 of the base frame 110, respectively. Alternatively, the head column 122 and the foot column 124 may be integrated with the head portion 114 and the foot portion 116 of the base frame 110, respectively. The head column 122 and the foot column 124 may be actuated to raise and lower the head column 122 and the foot column 124 in the +/−Z direction of the coordinate axes depicted in FIGS. 1A and 1B, as will be described in further detail herein.

Figure 2A:
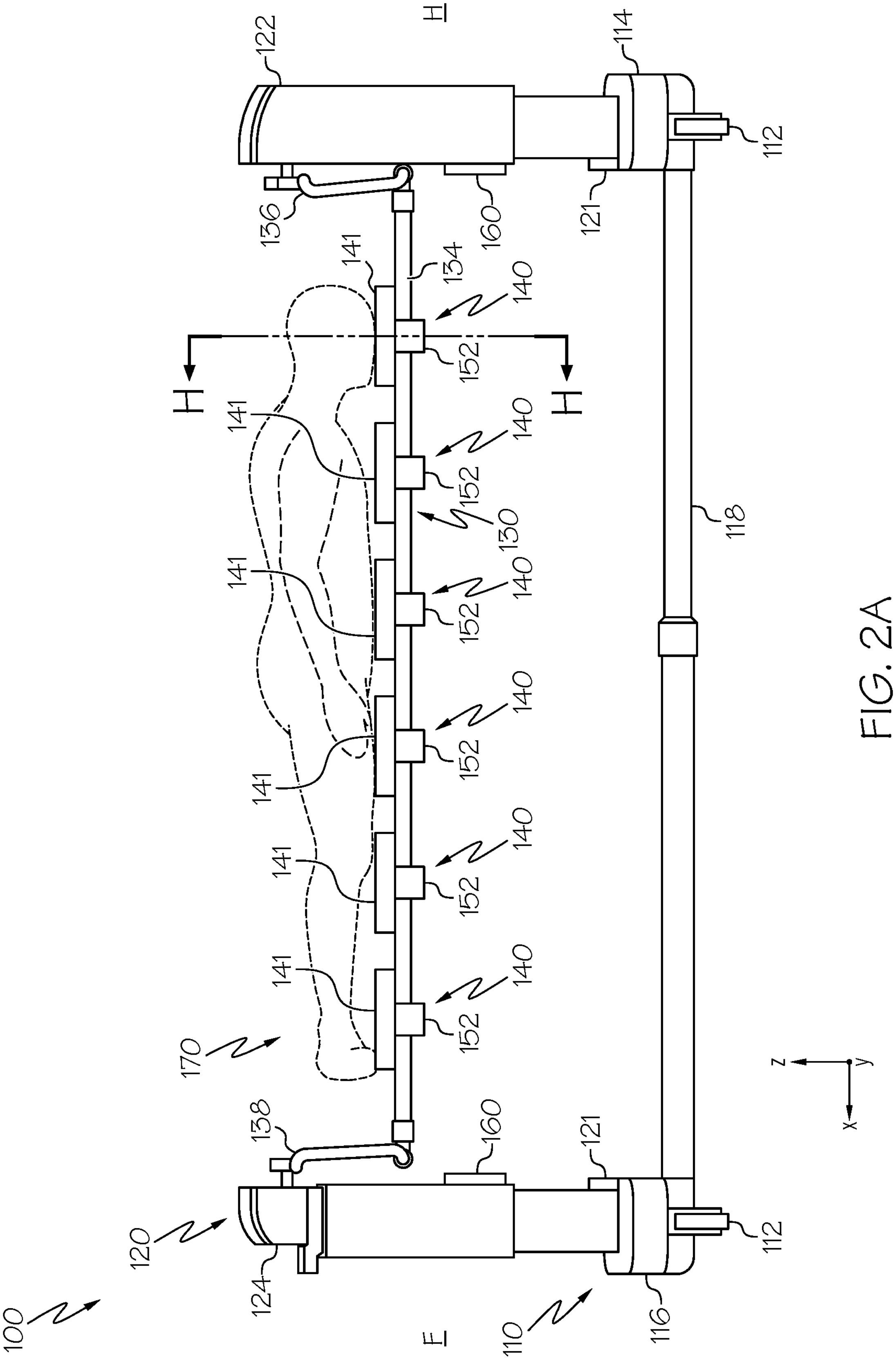
FIG. 2A schematically depicts a first side view of the illustrative person support apparatus of FIG. 1A according to one or more embodiments shown or described herein.
Figure 2B:
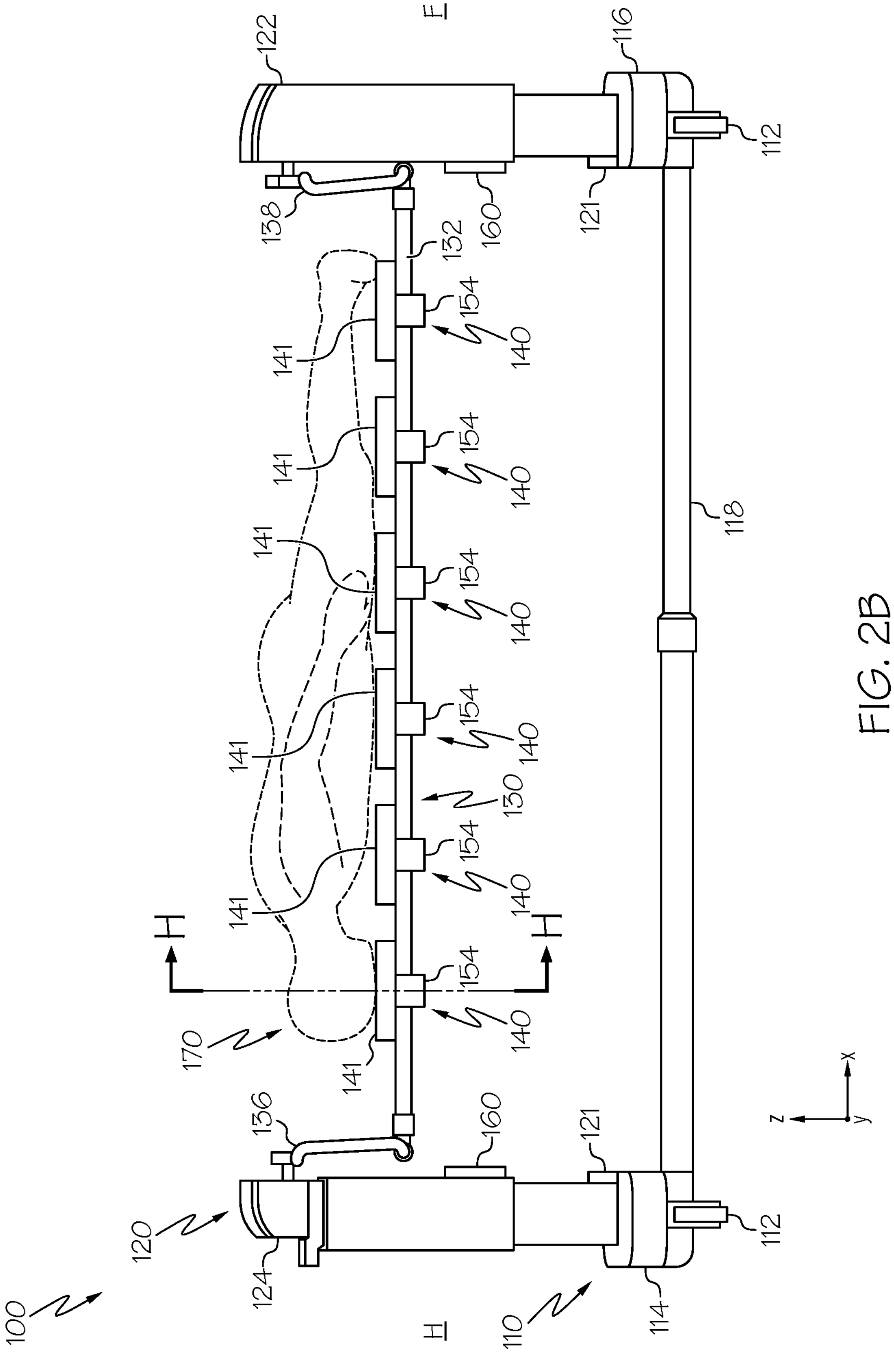
FIG. 2B schematically depicts a second side view of the illustrative person support apparatus of FIG. 1A according to one or more embodiments shown or described herein.
Figure 13A:
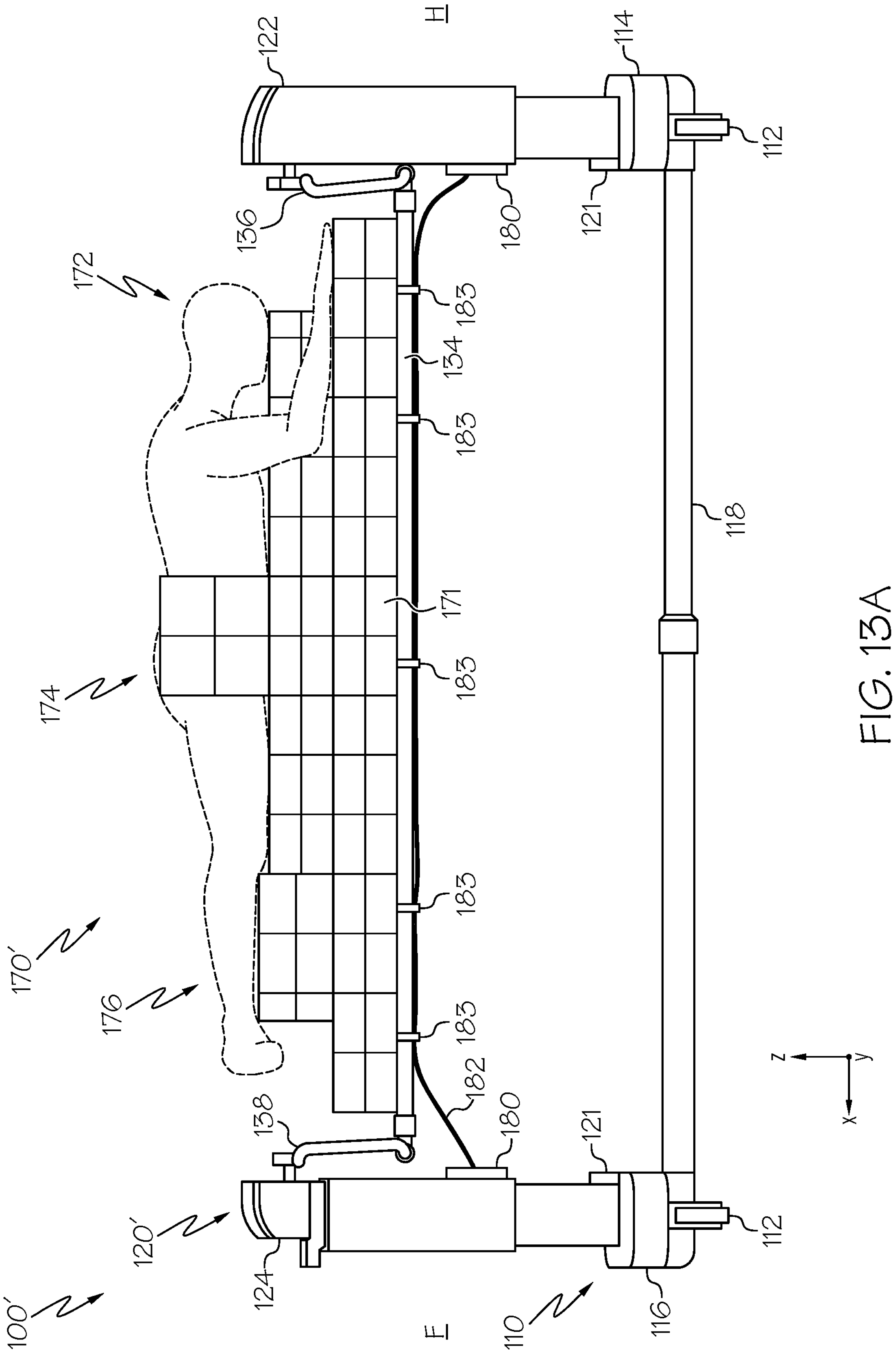
FIG. 13A schematically depicts a first side view of the illustrative person support apparatus of FIG. 1B according to one or more embodiments shown or described herein.
Figure 13B:
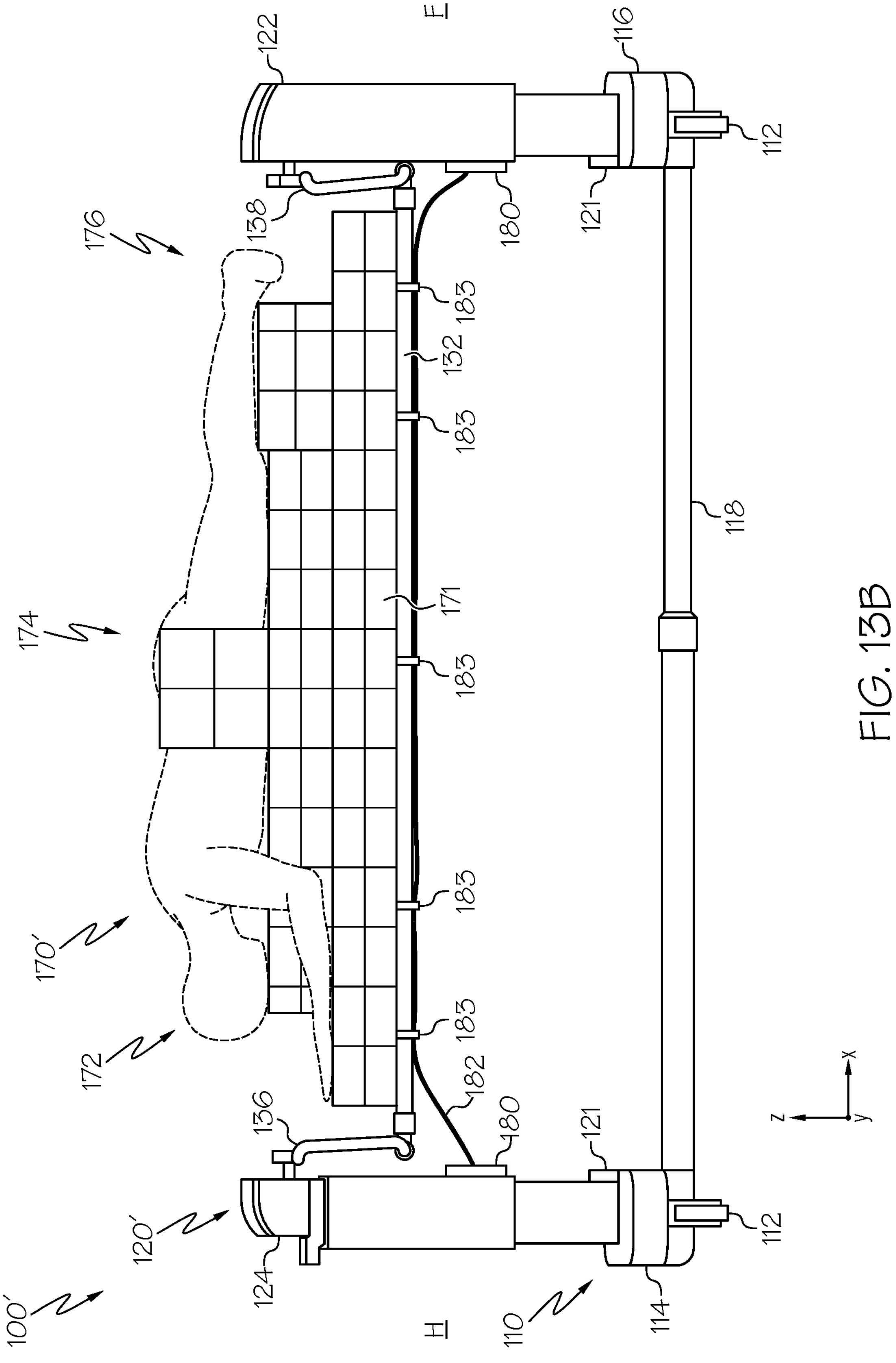
FIG. 13B schematically depicts a second side view of the illustrative person support apparatus of FIG. 1B according to one or more embodiments shown or described herein.

The primary support frame 120 includes a longitudinal frame 130 that is positioned above the base frame 110 in the vertical direction and that extends between the head column 122 and the foot column 124 in the longitudinal direction. The longitudinal frame 130 is coupled to the head column 122 and the foot column 124 such that the longitudinal frame 130 may be raised, lowered, and/or tilted with respect to the base frame 110 upon actuation of the head column 122 and the foot column 124. In the embodiments depicted in FIGS. 1A and 1B, the longitudinal frame 130 generally extends in the horizontal plane (i.e., the X-Y plane as depicted). However, it should be understood that the longitudinal frame 130 may be tilted with respect to the X-Y plane (i.e., about an axis of rotation generally parallel to the Y-axis in the coordinate axes depicted in FIGS. 1A and 1B) or rotated with respect to the X-Y plane (i.e., about an axis of rotation generally parallel to the X-axis in the coordinate axes depicted in FIGS. 1A and 1B). While FIGS. 1A and 1B generally depict the longitudinal frame as being substantially planar, in other embodiments, the longitudinal frame 130 may be contoured and may include portions that extend out of the horizontal plane. In some embodiments, the longitudinal frame 130 may include a first side rail 132 and a second side rail 134, where the first side rail 132 and the second side rail 134 extend substantially parallel to each other in the longitudinal direction between the head column 122 and the foot column 124. The first side rail 132 and the second side rail 134 may be coupled to the head column 122 and the foot column 124, respectively, by a head support piece 136 and a foot support piece 138. The head support piece 136 may be coupled between the head column 122 and the first and second side rails 132, 134. In embodiments, the head support piece 136 and the foot support piece 138 may be pivotable with respect to the head column 122 and the foot column 124 about an axis of rotation that is generally parallel to the X-axis in the coordinate axes depicted in FIGS. 1A and 1B. The foot support piece 138 may be coupled between the foot column 124 and the first and second side rails 132, 134. As depicted in FIGS. 2A-2B, in some embodiments, the longitudinal frame 130 supports and may be coupled to the support deck 170, which includes the one or more support pad assemblies 140, each of which extends a distance in the longitudinal direction between the head column 122 and the foot column 124 and extends a distance in the lateral direction. Alternatively, as depicted in FIGS. 13A-13B, the longitudinal frame 130 supports and may be coupled to the support deck 170', which extends a distance between the head column 122 and the foot column 124 in the longitudinal direction.

Figure 3:
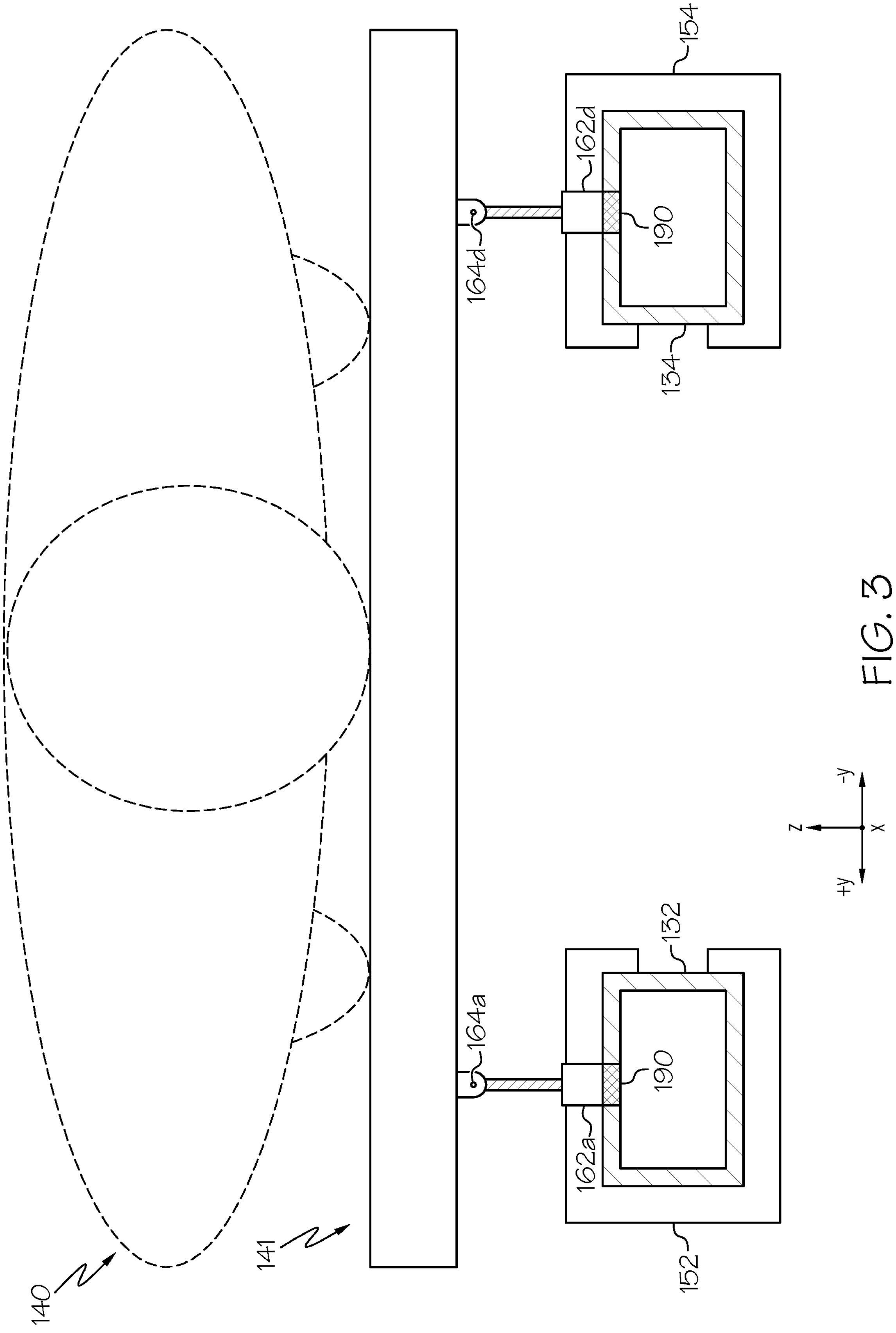
FIG. 3 schematically depicts a cross-sectional view of an illustrative person support apparatus according to one or more embodiments shown or described herein.

Referring now to FIG. 3, in some embodiments, the longitudinal frame 130, particularly the first side rail 132 and the second side rail 134, may each include one or more quick disconnect slots 190 formed therein. The quick disconnect slots 190 allow for accessories to be attached to the longitudinal frame 130. In embodiments where the accessories require electrical power, the quick disconnect slots 190 may also provide power to the accessories through the longitudinal frame 130. More specifically, the quick disconnect slots 190 may include electrical connections integrated with the side rails 132, 134 of the longitudinal frame 130. The electrical connections may be electrically coupled to a power source which, in the embodiments described herein, is an actuator control unit 160 (depicted in FIG. 1A). In embodiments, the quick disconnect slots 190 include a channel formed in the side rails 132, 134 and an electrical connector either affixed to the side rails 132, 134 within the channel or affixed on the interior of the side rails 132, 134 adjacent to the channel. The quick disconnect slots 190 allow for an electrical or an electronic connection between the actuator control unit 160 and an accessory that is attached to the quick disconnect slot 190, such as, for example, an actuator coupled to the clamp 152, 154. In embodiments where the accessories are pneumatically or hydraulically actuated, the quick disconnect slots 190 may contain pneumatic or hydraulic lines that can be coupled to the accessories when the accessories are engaged with the quick disconnect slots 190. In these embodiments, the quick disconnect slots 190 may include a fluid coupling which permits a pneumatically or hydraulically actuated accessory, such as an actuator or the like, to be fluidly coupled to a pneumatic or hydraulic line.

In some embodiments, a plurality of the quick disconnect slots 190 may be spaced at particular locations along the length of each side rail 132, 134. In some embodiments, the quick disconnect slots 190 may be spaced in pairs such that a first quick disconnect slot 190 is positioned in a first location on the first side rail 132 and a second quick disconnect slot 190 is positioned in a second location on the second side rail 134, where the first and second locations are parallel and opposing each other at an equal distance from the head column 122 and the foot column 124.

While FIG. 3 schematically depicts the quick disconnect slots 190 as being disposed on the top of each side rail 132, 134, it should be understood that other configurations are contemplated and possible. For example, the quick disconnect slots 190 may be disposed along the sides of the side rails 132, 134 or even on a bottom of the side rails 132, 134. In some embodiments, the side rails 132, 134 may have quick disconnect slots on each surface thereof (i.e., top, bottom, and sides).

Referring again to FIGS. 1A and 1B, as noted above, the head column 122 and the foot column 124 may be adjustable in the vertical direction such that the head column 122 and the foot column 124 may raise or lower the longitudinal frame 130 with respect to the base frame 110 in the vertical direction. In some embodiments, at least one column actuator 121 is coupled to the head column 122 and/or the foot column 124. The at least one column actuator 121 moves the head column 122 and the foot column 124 upward and downward in the vertical direction with respect to the base frame 110. The column actuator 121 may be a powered actuator, such as an electric motor, linear actuator, pneumatic cylinder, hydraulic cylinder, or the like, or may be manually powered, such as by a system of gears actuated by a pedal, a crank, or the like, or even a hydraulic cylinder actuated by a pedal, a crank, or the like. For example, the column actuator 121 may also include a linear actuator, a hydraulic actuator, a pneumatic actuator, an electro-mechanical actuator, or the like.

The head column 122 and the foot column 124 may be raised and lowered in the vertical direction independent of one another such that the longitudinal frame 130 may be tilted with respect to the horizontal plane (i.e., the X-Y plane), as described above. For example, the head column 122 may be raised with respect to the foot column 124 in the vertical direction such that the head end of the longitudinal frame 130 is positioned higher than the foot end of the longitudinal frame 130 in the vertical direction (i.e., a reverse Trendelenburg position). Conversely, the foot column 124 may be raised with respect to the head column 122 in the vertical direction, such that the foot end of the longitudinal frame 130 is positioned higher than the head end of the longitudinal frame 130 in the vertical direction (i.e., a Trendelenburg position). In some embodiments, both the head column 122 and the foot column 124 of the primary support frame 120 may be raised or lowered in the vertical direction simultaneously and in conjunction with one another, thereby raising both the head end and the foot end of the longitudinal frame 130.

Referring now to the embodiment of the person support apparatus 100 depicted in FIGS. 1A and 2A-2B, the support deck 170 may comprise one or more support pad assemblies 140. Each one of the one or more support pad assemblies 140 are coupled to the longitudinal frame 130 and are positioned between the head column 122 and the foot column 124. Each of the one or more support pad assemblies 140 extends in the lateral direction (i.e., generally along the Y axis) by a width W from the first side rail 132 to the second side rail 134. In some embodiments, each of the one or more support pad assemblies 140 may extend beyond the side rails 123, 134, as depicted in FIG. 1A. In the embodiment depicted in FIG. 1A, the one or more support pad assemblies 140 includes six support pads 141 positioned at various locations between the head column 122 and the foot column 124. However, it should be understood that the number of support pad assemblies 140 coupled to the longitudinal frame 130 between the head column 122 and the foot column 124 is not limited by the present disclosure. In some embodiments, the person support apparatus 100 may include a suitable number of support pad assemblies 140 sufficient to support a subject thereon. In some embodiments, the support pad assemblies 140 may support a particular section of a subject's body. For example, one or more of the support pad assemblies 140 may be positioned generally at or near the foot end F of the person support apparatus 100 for supporting the lower body and/or legs of a subject. In another example, one or more of the support pad assemblies 140 may be positioned generally at or near the head end H of the person support apparatus 100 for supporting the upper body and/or head of a subject. In yet another example, one or more of the support pad assemblies 140 may be positioned such that they generally support a torso and/or a midsection of a subject.

Still referring to FIGS. 1A and 2A-2B, in embodiments, the support pad 141 in each support pad assembly 140 may have at least one planar configuration in which the support pad 141 is a generally planar surface that supports a subject on the person support apparatus 100. For example, the support pad 141 may include a rigid substrate and a cover portion with a cushioning material, such as foam or the like, disposed between the substrate and the cover. In some embodiments, at least one support pad 141 of a support pad assembly 140 may include a contoured or a shaped surface to accommodate a specific portion of a subject. For example, a support pad 141 positioned to support a subject's head may be contoured to correspond to an approximate shape and size of a subject's head.

Figure 4A:
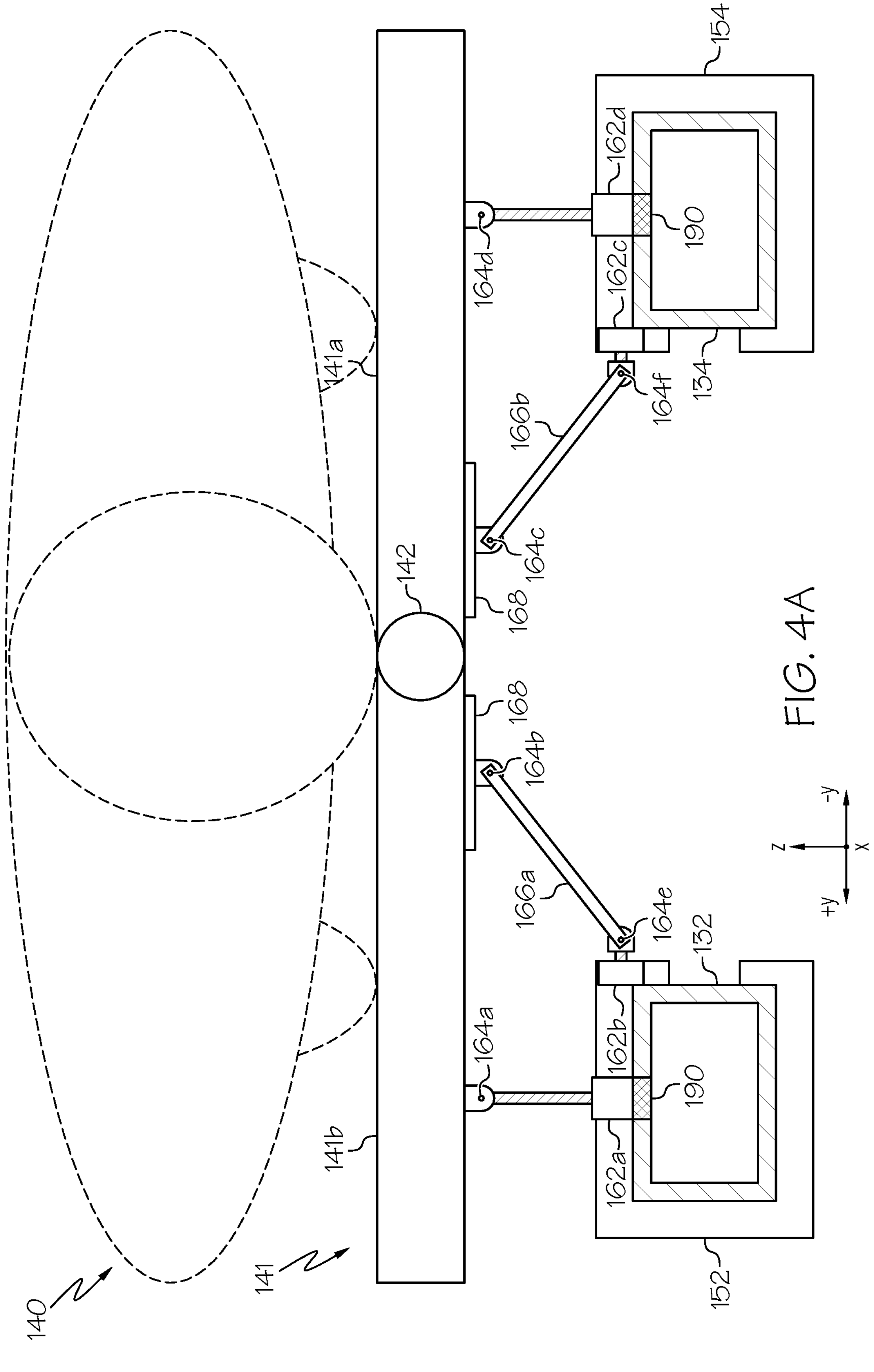
FIG. 4A schematically depicts a cross-sectional view taken on lines H-H of FIGS. 2A and 2B according to one or more embodiments shown or described herein.

Referring to FIGS. 1A, 2A-2B, 3, and 4A, the support pad 141 of each support pad assembly 140 is coupled to the longitudinal frame 130 with one or more clamps 152, 154. In some embodiments, each support pad 141 may be coupled to the longitudinal frame 130 via a plurality of clamps. More particularly, as shown in FIGS. 3 and 4A, the support pad assembly 140 includes a first clamp 152 that is coupled to the first side rail 132 and a second clamp 154 that is coupled to the second side rail 134. The first and second clamps 152, 154 may be coupled such that they are slidably movable and repositionable along a length of the respective side rails 132, 134. Accordingly, it should be understood that the clamps 152, 154 (and the support pad 141 coupled thereto) are repositionable along the length of the longitudinal frame 130. In addition, the first and second clamps 152, 154 may be coupled to the respective side rails 132, 134 such that the first and second clamps 152, 154 retain the support pad 141 on the respective side rails 132, 134. In some embodiments, the clamps 152, 154 may be spaced in pairs such that the first clamp 152 is positioned in a first location on the first side rail 132 and the second clamp 154 is positioned in a second location on the second side rail 134, where the first and second locations are parallel and opposing each other at an equal distance from the head column 122 and the foot column 124. In some embodiments, each clamp 152, 154 may be positioned at a location on the respective side rail 132, 134 that contains a quick disconnect slot 190 such that each of the clamps 152, 154 are engaged with a corresponding quick disconnect slot 190.

Figure 5A:
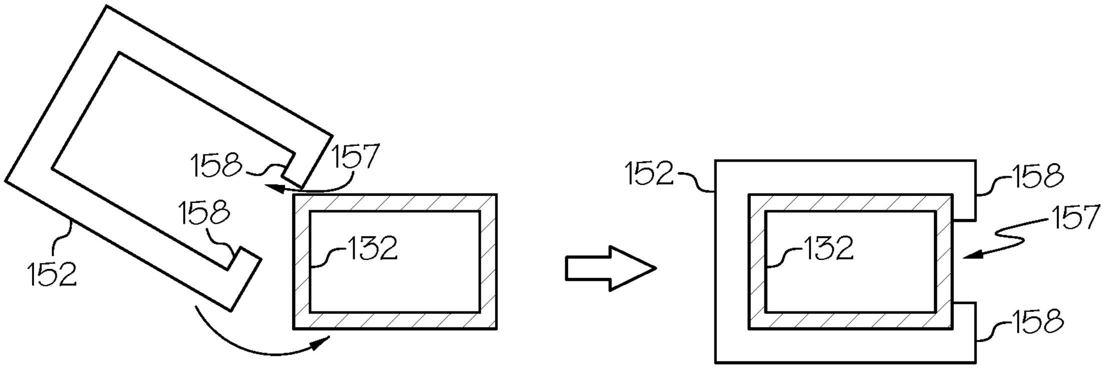
FIG. 5A schematically depicts an illustrative clamp according to one or more embodiments shown or described herein.

The first and second clamps 152, 154 are coupled to the respective side rails 132, 134 via one or more clamping features. For example, as shown in FIG. 5A, the first clamp 152 may be a "C" shaped clamp having an opening 155 and one or more lips 158 that extend towards the opening 155 in the "C" shape. As such, the first clamp 152 receives the first side rail 132 by allowing the first side rail 132 to pass through the opening 155. In addition, once the first clamp 152 is arranged around the first side rail 132, the one or more lips 158 prevent the first clamp 152 from slipping off of the first side rail 132. In this embodiment, the clamp 152 may be formed from a material which is elastically deformable and recoverable, such as a polymeric material or the like, to facilitate attaching the clamp 152 to a respective side rail (e.g., the first and second side rails 132, 134).

Figure 5B:
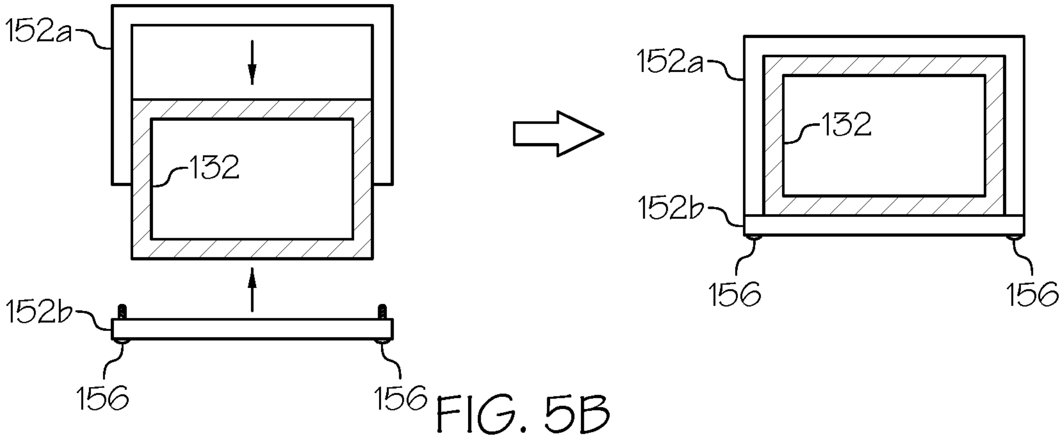
FIG. 5B schematically depicts another illustrative clamp according to one or more embodiments shown or described herein.

In another example, as shown in FIG. 5B, the first clamp 152 may have a first clamp portion **152*a* and a second clamp portion 152*b* that is separate from the first clamp portion 152*a*. The first clamp portion 152*a* is attachable to the second clamp portion 152*b* such that the first side rail 132 is enclosed within the first clamp 152. In some embodiments, the first clamp portion 152*a* may be secured to the second clamp portion 152*b* via one or more attachment devices 156**, such as threaded fasteners, clips, or the like.

Figure 5C:
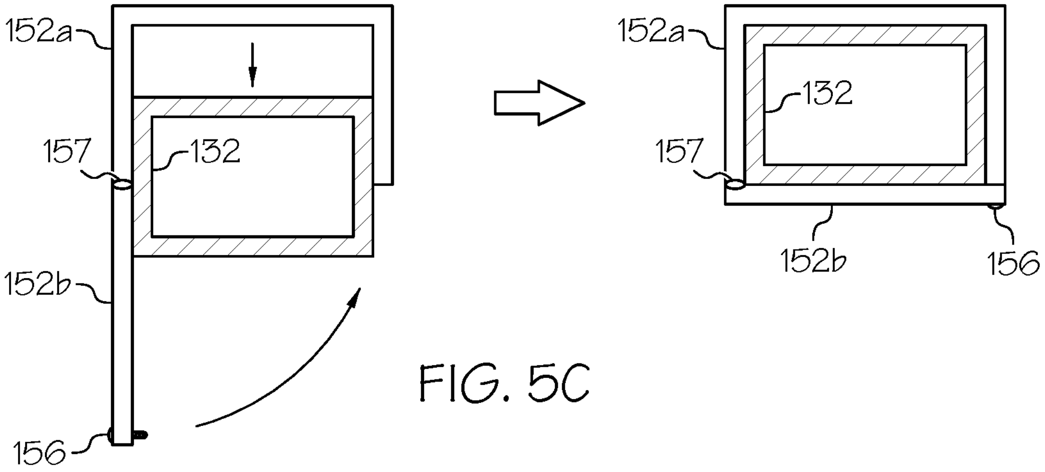
FIG. 5C schematically depicts yet another illustrative clamp according to one or more embodiments shown or described herein.

In yet another example, as shown in FIG. 5C, the first clamp portion **152*a* may be partially attached to the second clamp portion 152*b* via a clamp hinge 157 such that the first clamp portion 152*a* and the second clamp portion 152*b* can be brought together around the first side rail 132 by rotating the second clamp portion 152*b* about the clamp hinge 157 from an open position to a closed position. In some embodiments, the first clamp portion 152*a* may be further secured to the second clamp portion 152*b* via one or more attachment devices 156 including, without limitation, threaded fasteners, clips, latches, or the like. While only the first clamp 152 is depicted with respect to FIGS. 5A, 5B, and 5C, it should be understood that the second clamp 154** may also incorporate such clamping features.

Referring now to FIG. 3, one embodiment of a support pad assembly 140 is schematically depicted in cross section. As shown in FIG. 3, the support pad 141 of the support pad assembly 140 is coupled to the first and second clamps 152, 154 with actuators **162*a* and 162*d*. Specifically, the first clamp 152 includes an actuator 162*a* affixed thereto. The actuator 162*a* is coupled to an underside of the support pad 141 at a pivot point 164*a* which, in embodiments, may be a pin and clevis connection or a similar connection which allows the support pad 141 to pivot with respect to the actuator 162*a*. Similarly, the second clamp 154 includes an actuator 162*d* affixed thereto. The actuator 162*d* is coupled to an underside of the support pad 141 at a pivot point 164*d* which, in embodiments, may be a pin and clevis connection or a similar connection which allows the support pad 141 to pivot with respect to the actuator 162*d*. In embodiments, the actuators 162*a*, 162*d* are electrically coupled to conductors associated with the quick disconnect slots 190 of the side rails 132, 134. The actuators 162*a*, 162*d* may be used to raise and lower the support pad 141 with respect to the side rails 132, 134 in the +/−Z direction of the coordinate axes depicted in FIG. 3. That is, the actuators 162*a*, 162*d* may be extended in the +Z direction to raise the support pad 141 and retracted in the −Z direction to lower the support pad 141 from a raised position. In addition, the pivot points 164*a*, 164*d* permit the support pad 141 to be tilted about an axis parallel to the X axis of the coordinate axes depicted in FIG. 3. That is, the actuators 162*a*, 162*d* may be actuated by different amounts to pivot the support pad 141 about an axis parallel to the X axis. For example, in one embodiment, one of the first actuator 162*a* and the second actuator 162*d* may be raised while the other is maintained in position to facilitate pivoting the support pad 141** about an axis parallel to the X axis.

In the embodiment depicted in FIG. 3, the actuators 162*a*, 162*d* are electro-mechanical actuators, such as linear actuators. In these embodiments, the actuators 162*a*, 162*d* are configured such that the actuators are locked in position unless power is applied to unlock and actuate them. While the actuators 162*a*, 162*d* are described as powered actuators, it should be understood that other types of actuators are contemplated and possible including, without limitation, pneumatic actuators, hydraulic actuators, or the like. Moreover, it should be understood that the actuators 162*a*, 162*d* may be powered actuators or, alternatively, may be manually actuated. In the embodiment depicted in FIG. 3, the actuators 162*a*, 162*d* are coupled to electrical quick disconnect slots 190 formed in the top of the side rails 132, 134. However, it should be understood that other orientations are contemplated and possible. For example, configuring the clamps 152, 154 such that the actuators 162*a*, 162*d* are attached are positioned on the sides of the side rails 132, 134 may allow for the use of actuators with a greater amount of travel, allowing for more flexibility in the positioning of the support pads 141 relative to the side rails 132, 134 of the longitudinal frame 130.

Referring now to FIGS. 1A and 4A, in some embodiments, one or more of the support pads 141 may include a pad hinge 142. The pad hinge 142 allows the support pad 141 to be folded along an axis 144 that extends through the pad hinge 142. That is, the pad hinge 142 allows a first section 141*a* and a second section 141*b* of the support pad 141 to be folded towards one another about the pad hinge 142, permitting the support pad 141 to be adjusted from a substantially planar configuration to a "V" configuration wherein the first section 141*a* and the second section 141*b* of the support pad 141 are angled towards one another. Other positions will be discussed herein with respect to FIGS. 12A-1 to 12D-2. In embodiments, the pad hinge 142 may be centrally located along the width W of the support pad 141. Specifically, the pad hinge 142 may be located such that the pad hinge 142 evenly bisects the support pad 141 in the longitudinal direction. Alternatively, the pad hinge 142 may be positioned at another location along the width W between the first side rail 132 and the second side rail 134.

In the embodiment depicted in FIG. 4A, the support pad assembly 140 includes a pad hinge 142 such that the first section 141*a* and the second section 141*b* of the support pad 141 are pivotable with respect to one another. The support pad assembly further includes actuators 162*a*, 162*b*, 162*c*, 162*d* to facilitate raising and lowering the support pad 141 in the +/−Z direction of the coordinate axes depicted in FIG. 4A, as well as to facilitate folding the first section 141*a* and second section 141*b* of the support pad 141 with respect to one another about the pad hinge 142.

Specifically, as described above with respect to FIG. 3, the first clamp 152 includes an actuator 162*a* affixed thereto. The actuator 162*a* is coupled to an underside of the support pad 141 at a pivot point 164*a* which, in embodiments, may be a pin and clevis connection or a similar connection which allows the support pad 141 to pivot with respect to the actuator 162*a*. Similarly, the second clamp 154 includes an actuator 162*d* affixed thereto. The actuator 162*d* is coupled to an underside of the support pad 141 at a pivot point 164*d* which, in embodiments, may be a pin and clevis connection or a similar connection which allows the support pad 141 to pivot with respect to the actuator 162*d*. In embodiments, the actuators 162*a*, 162*d* are electrically coupled to conductors associated with the quick disconnect slots 190 of the side rails 132, 134. The actuators 162*a*, 162*d* may be used to raise and lower the support pad 141 with respect to the side rails 132, 134 in the +/−Z direction of the coordinate axes depicted in FIG. 4A. Alternatively, the actuators 162*a*, 162*d* may be used to tilt the support pad 141, as described hereinabove with respect to FIG. 3.

In addition, each of the clamps 152, 154 includes a second actuator 162*b*, 162*c* which may be used to control folding of the support pad 141 about pad hinge 142. Specifically, the first clamp 152 includes an actuator 162*b* attached to the first clamp 152 in-board of the side rail 132 (that is, actuator 162*b* is positioned between the side rail 132 and the longitudinal centerline of the longitudinal frame 130). The actuator 162*a* and the actuator 162*b* are oriented such that the direction of extension of each actuator is non-parallel with the direction of extension of the other actuator. For example, in the embodiment of the support pad assembly 140 depicted in FIG. 4A, the direction of extension of actuator 162*a* is generally orthogonal to the direction of extension of actuator 162*b*. In embodiments, actuator 162*b* is connected to the underside of the support pad 141 with a link arm 166*a*. More specifically, the link arm 166*a* is pivotally coupled to actuator 162*b* with a pivot point 164*e*, such as a pin and clevis connection or a similar pivoting connection. Link arm 166*a* is also pivotally coupled to the underside of the support pad 141 with a pivot point 164*b*, such as a pin and clevis connection or a similar pivoting connection.

Figure 4B:
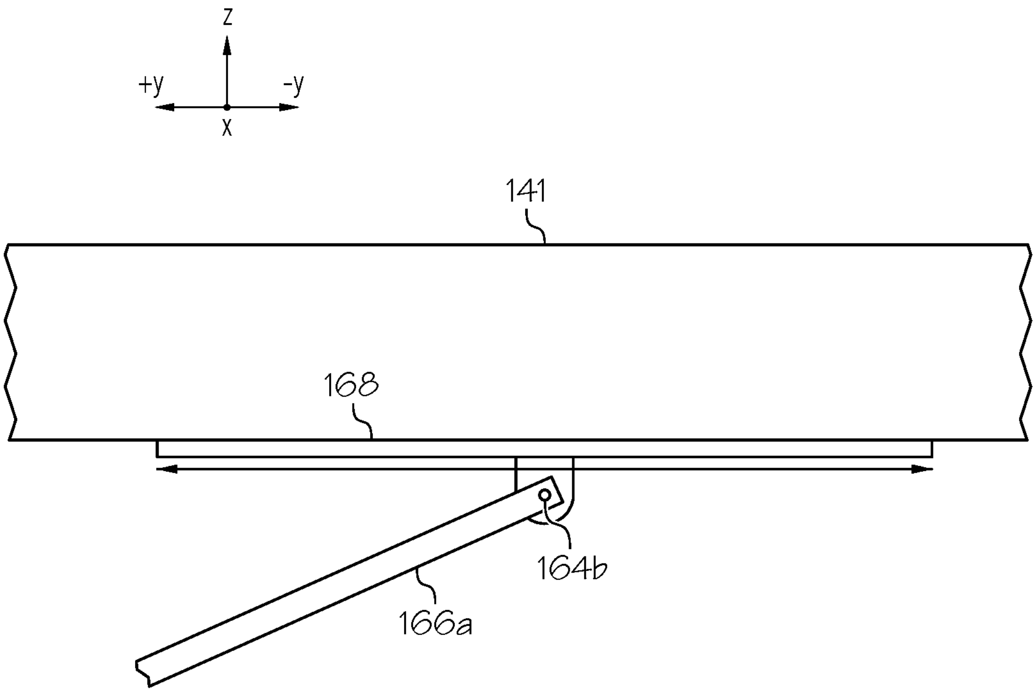
FIG. 4B schematically depicts a detailed view of an illustrative track mechanism on a support deck according to one or more embodiments shown or described herein.

Referring now to FIGS. 4A and 4B, in embodiments, the pivot point 164*b* to which link arm 166*a* is connected may be disposed in a track 168 on the underside of the support pad 141. In this embodiment, the track 168 allows the pivot point 164*b* to slide in the lateral direction (i.e., the +/−Y direction of the coordinate axes depicted in FIGS. 4A and 4B). Permitting the pivot point 164*b* to slide in the track 168 assists in folding the first section 141*a* and the second section 141*b* of the support pad 141 with respect to one another about the pad hinge 142.

Referring again to FIG. 4A, similar to the first clamp 152, the second clamp 154 includes an actuator 162*c* attached to the second clamp 154 in-board of the side rail 134 (that is, actuator 162*c* is positioned between the side rail 134 and the longitudinal centerline of the longitudinal frame 130). The actuator 162*d* and the actuator 162*c* are oriented such that the direction of extension of each actuator is non-parallel with the direction of extension of the other actuator. For example, in the embodiment of the support pad assembly 140 depicted in FIG. 4A, the direction of extension of actuator 162*d* is generally orthogonal to the direction of extension of actuator 162*c*. In embodiments, actuator 162*c* is connected to the underside of the support pad 141 with a link arm 166*b*. More specifically, the link arm 166*b* is pivotally coupled to actuator 162*c* with a pivot point 164*f*, such as a pin and clevis connection or a similar pivoting connection. Link arm 166*b* is also pivotally coupled to the underside of the support pad 141 with a pivot point 164*c*, such as a pin and clevis connection or a similar pivoting connection. In embodiments, the pivot point 164*c* coupling the underside of the support pad 141 with the link arm 166*b* may be disposed in a track, as described hereinabove with respect to FIG. 4B.

In the embodiment depicted in FIG. 4A, the actuators 162*a*, 162*b*, 162*c*, and 162*d* are electro-mechanical actuators, such as linear actuators. In these embodiments, the actuators 162*a*, 162*b*, 162*c*, and 162*d* are configured such that the actuators are locked in position unless power is applied to unlock and actuate them. While the actuators

162*a*, 162*b*, 162*c*, and 162*d* are described as powered actuators, it should be understood that other types of actuators are contemplated and possible, including, without limitation, pneumatic actuators, hydraulic actuators, or the like. For example, the actuators 162*a*-162*d* may be powered actuators, such as actuators having an electric motor or the like, or may be manually powered actuators, such as actuators powered by a foot pedal, hand crank, or the like. In embodiments where the actuators 162*a*-162*d* are powered, the actuators may be connected to one of the plurality of quick disconnect slots 190 located on the longitudinal frame 130. In the embodiment depicted in FIG. 4A the actuators 162*a*, 162*b*, 162*c*, and 162*d* are coupled to electrical quick disconnect slots 190 formed in the top of the side rails 132, 134. However, it should be understood that other orientations are contemplated and possible. For example, configuring the first and second clamps 152, 154 such that the actuators 162*a*, 162*b*, 162*c*, and 162*d* are attached and positioned on the sides of the side rails 132, 134 may allow for the use of actuators with a greater amount of travel, allowing for more flexibility in the positioning of the support pads 141 relative to the side rails 132, 134 of the longitudinal frame 130.

Figure 6A:
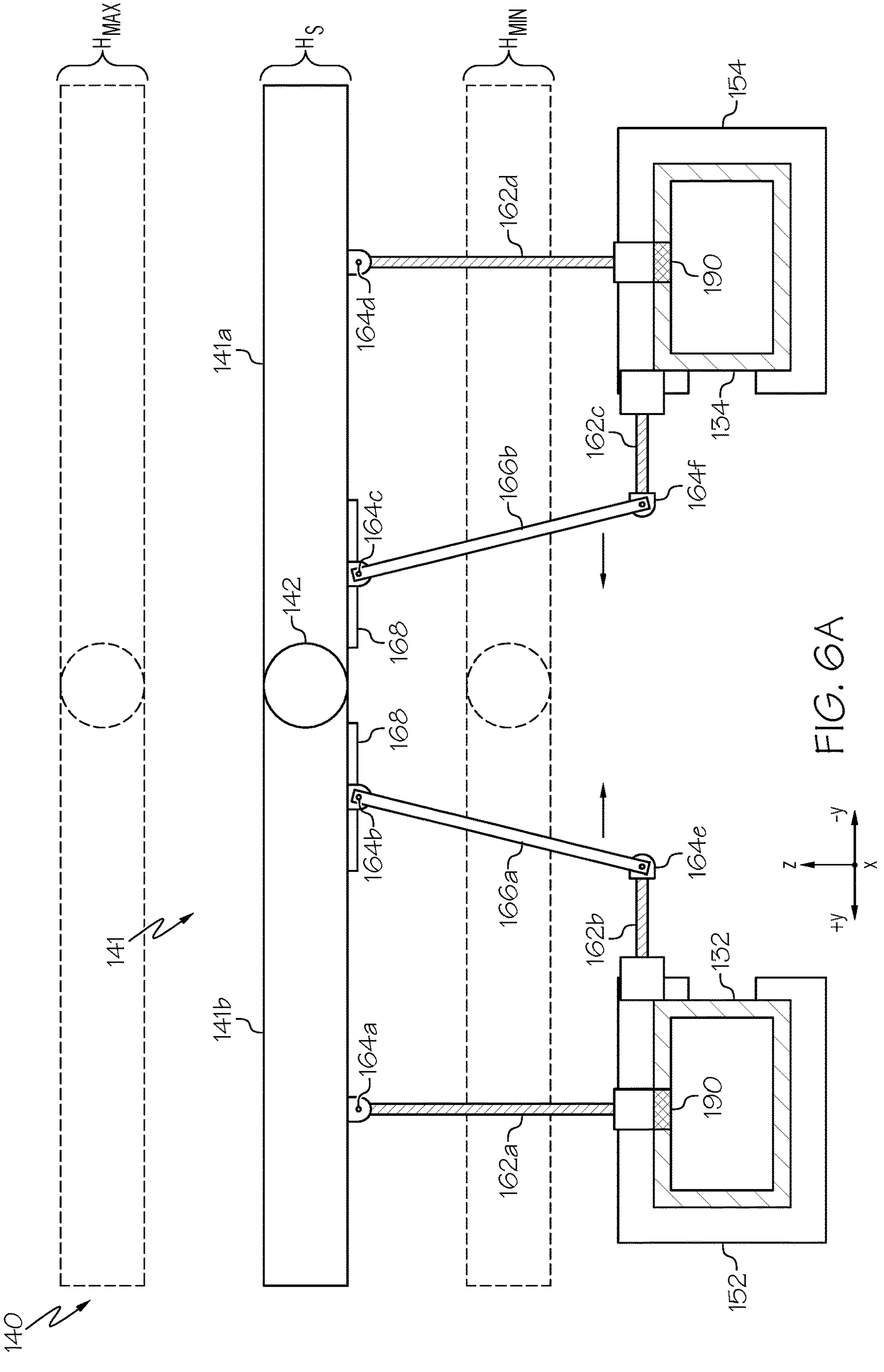
FIG. 6A schematically depicts movement of an illustrative person support apparatus having various support pad heights according to one or more embodiments shown or described herein.
Figure 6B:
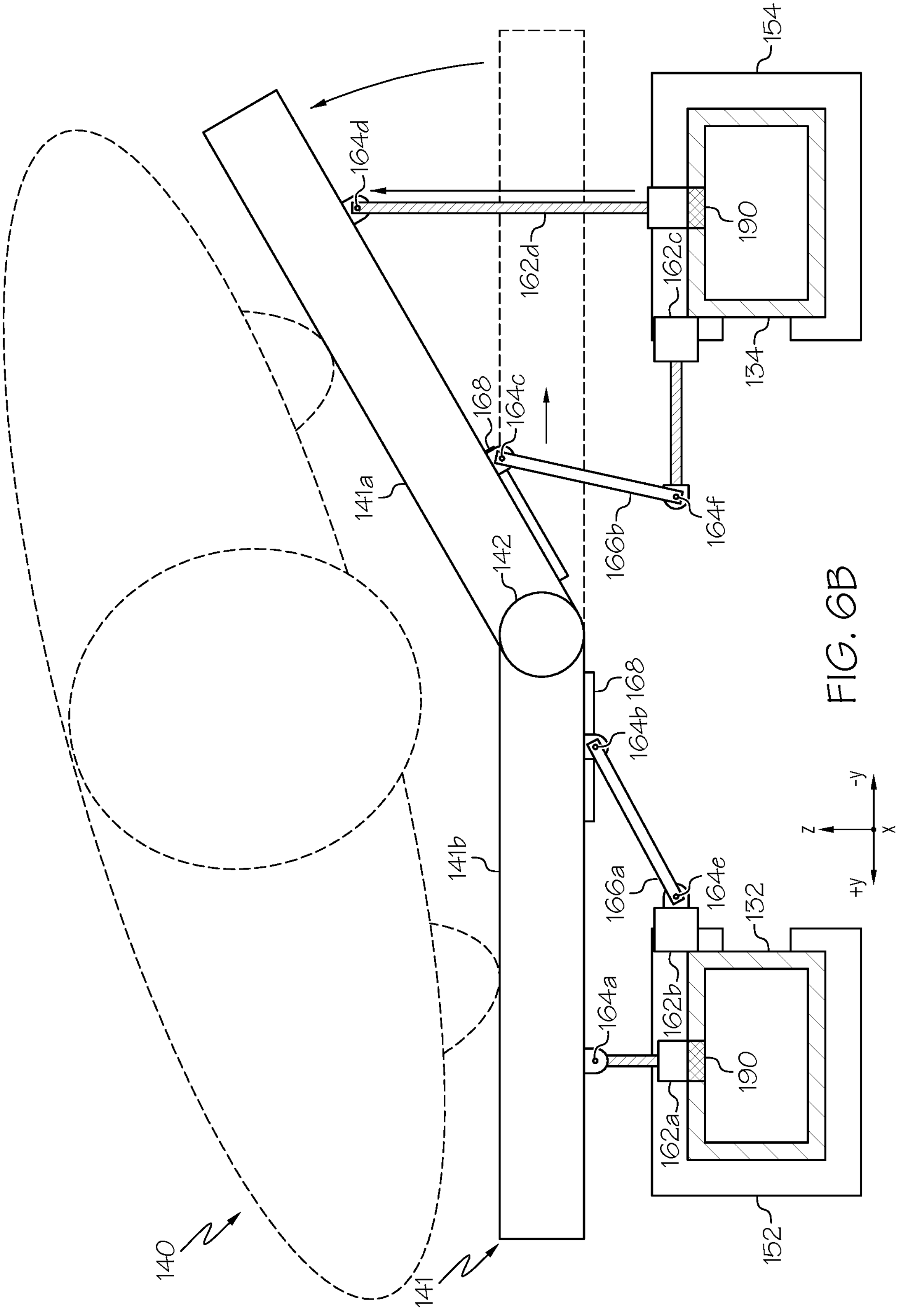
FIG. 6B schematically depicts a cross-sectional view of an illustrative person support apparatus with a portion of a support pad raised according to one or more embodiments shown or described herein.

Referring now to FIGS. 6A and 6B by way of example, the actuators 162*a*, 162*b*, 162*c* and 162*d* may be actuated in conjunction with one another to facilitate raising and lowering the support pad 141 with respect to the side rails 132, 134 and/or folding the first section 141*a* and second section 141*b* of the support pad 141 with respect to one another, as noted above.

Referring to FIG. 6A by way of example, to raise the support pad 141 with respect to the side rails 132, 134 while maintaining the support pad 141 in a substantially planar configuration, actuator 162*a* may be actuated, thereby extending the actuator 162*a* in the +Z direction of the coordinate axes depicted in FIG. 6A. Similarly, actuator 162*d* may be actuated, thereby extending the actuator 162*d* in the +Z direction of the coordinate axes depicted in FIG. 6A. As actuators 162*a*, 162*d* are extended, the actuators 162*a*, 162*d* exert a force on the support pad 141, thereby raising the support pad 141 in the +Z direction of the coordinate axes depicted in FIG. 6A. Simultaneous with the actuation of actuators 162*a* and 162*d*, actuators 162*b* and 162*c* are also actuated.

Specifically referring to actuator 162*b*, actuator 162*b* is extended in the −Y direction of the coordinate axes depicted in FIG. 6A. This causes the pivot point 164*b* on the underside of the support pad 141 to slide in the track 168 in the −Y direction towards the pad hinge 142 as the link arm 166*a* pivots about the pivot points 164*b*, 164*e* at either end of the link arm 166*a*. Once the pivot point 164*b* on the underside of the support pad 141 has reached the end of the track 168 in the −Y direction, continued extension of the actuator 162*b* transmits a force through the link arm 166*a* to the underside of the support pad 141, thereby preventing the second section 141*b* of the support pad 141 from folding about the pad hinge 142.

Simultaneously, actuator 162*c* is extended in the +Y direction of the coordinate axes depicted in FIG. 6A. This causes the pivot point 164*c* on the underside of the support pad 141 to slide in the track 168 in the +Y direction of the coordinate axes depicted in FIG. 6A towards the pad hinge 142 as the link arm 166*b* pivots about the pivot points 164*c*, 164*f* at either end of the link arm 166*b*. Once the pivot point 164*c* on the underside of the support pad 141 has reached the end of the track 168 in the +Y direction, continued extension of the actuator 162*c* transmits a force through the link arm 166*b* to the underside of the support pad 141, thereby preventing the first section 141*a* of the support pad 141 from folding about the pad hinge 142. In this manner, simultaneous actuation of the actuators 162*a*, 162*b*, 162*c*, and 162*d* may be used to raise the support pad 141 in the +Z direction of the coordinate axes depicted in FIG. 6A without folding the support pad 141 about the pad hinge 142. It should be understood that simultaneous actuation of the actuators 162*a*, 162*b*, 162*c*, and 162*d* may also be used to lower the support pad 141 in the −Z direction of the coordinate axes depicted in FIG. 6A by simultaneously retracting the actuators 162*a*, 162*b*, 162*c* and 162*d*.

While FIG. 6A depicts the support pad 141 being raised in the +Z direction of the coordinate axes depicted in FIG. 6A without folding the support pad 141 about the pad hinge 142, it should be understood that selective actuation of the actuators 162*a*, 162*b*, 162*c*, and 162*d* may also be used to fold the support pad 141 about the pad hinge 142.

Referring to FIG. 6B by way of example, the first section 141*a* of the support pad 141 may be folded about the pad hinge 142 by actuating the actuator 162*d*, thereby extending the actuator in the +Z direction of the coordinate axes depicted in FIG. 6B. As the actuator 162*d* is extended, the actuator 162*d* exerts a force on the underside of the support pad 141, causing the first section 141*a* of the support pad 141 to pivot about the pad hinge 142 towards the second section 141*b* of the support pad 141. During this procedure, actuator 162*c* is not actuated. As such, the pivoting motion of the first section 141*a* of the support pad 141 causes the link arm 166*b* to pivot about the pivot points 164*c*, 164*f* at either end of the link arm 166*b* as the pivot point 164*c* located on the underside of the first section 141*a* of the support pad 141 slides in its track 168 in the −Y direction of the coordinate axes depicted in FIG. 6B, away from the pad hinge 142.

While FIG. 6B depicts the first section 141*a* of the support pad 141 being folded about the pad hinge 142, it should be understood that the second section 141*b* of the support pad 141 may be similarly folded about the pad hinge 142 by selectively actuating actuators 162*a* and 162*b*. Further, it should be understood that the first section 141*a* and the second section 141*b* of the support pad 141 may both be folded about the pad hinge 142 by selective actuation of the actuators 162*a*, 162*b*, 162*c*, and 162*d*. Finally, it should be understood that folding of the support pad 141 may be performed with the support pad 141 oriented at its lowest position with respect to the side rails 132, 134 or with the support pad 141 in a raised position with respect to the side rails 132, 134.

Figure 7:
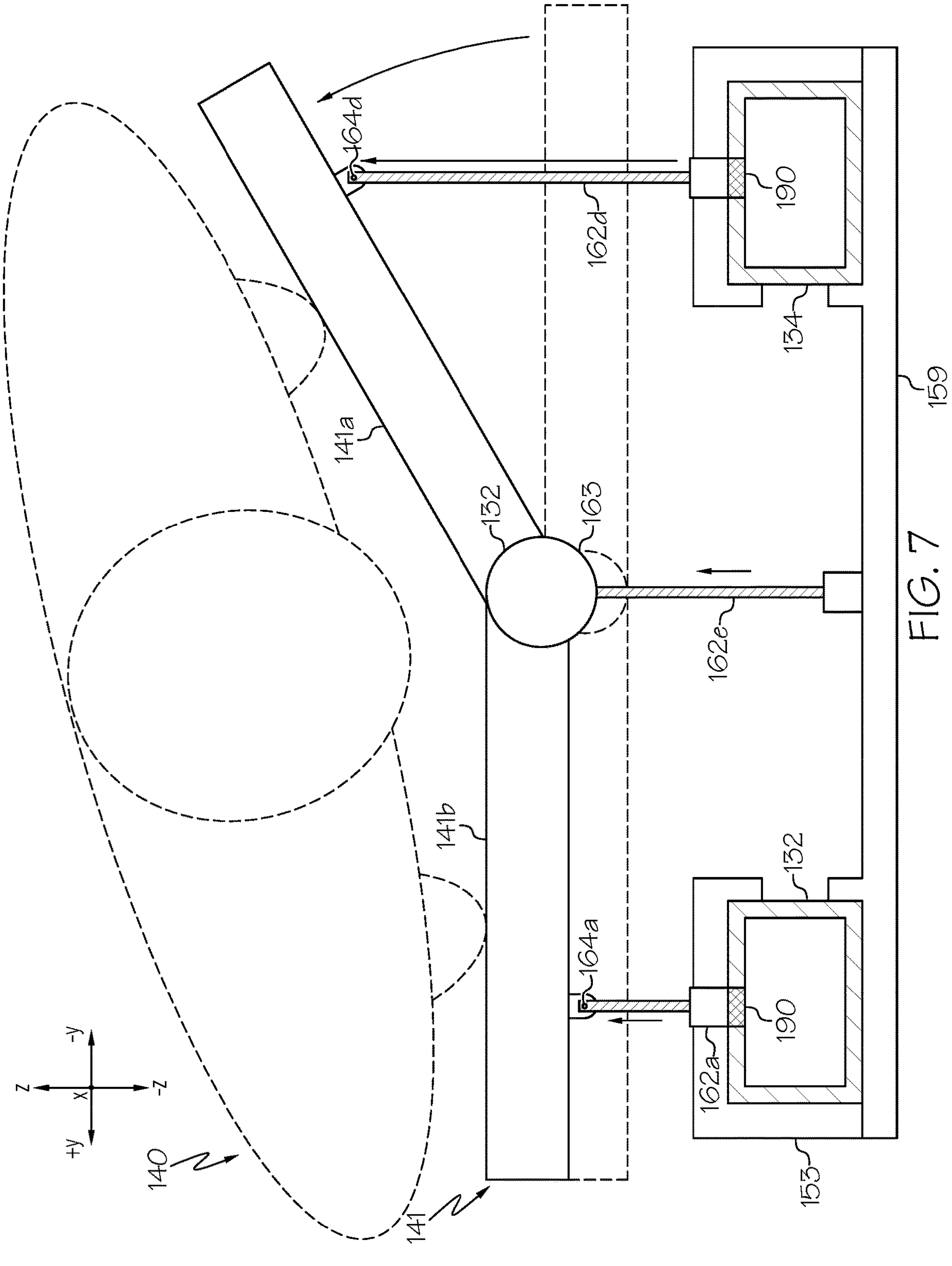
FIG. 7 schematically depicts a cross-sectional view of another illustrative person support apparatus with a portion of a support pad raised according to one or more embodiments shown or described herein.

Referring now to FIG. 7, an alternative embodiment of a support pad assembly 140 is schematically depicted. In this embodiment, the support pad assembly 140 includes a support pad 141 comprising a first section 141*a* and a second section 141*b*, which are foldable with respect to one another about pad hinge 142, as described hereinabove with respect to FIG. 4A. In this embodiment, the support pad assembly 140 is joined to the side rails 132, 134 with a single clamp 153 that extends between the side rails 132, 134 in the lateral direction of the person support apparatus 100. Specifically, the clamp 153 includes a lower clamping member 159 that extends between the side rails 132, 134. The support pad assembly 140 also includes actuators 162*a*, 162*d* coupled to the underside of the support pad 141, as described hereinabove with respect to FIGS. 3 and 4A. Accordingly, it should be understood that the actuators 162*a*, 162*d* may be used to raise and lower the support pad 141 in the vertical direction and also tilt the support pad 141 about an axis generally parallel to the X axis of the coordinate axes depicted in FIG. 7. In this embodiment, a central portion of the support pad 141, such as a portion containing the pad hinge 142, may be coupled to a central actuator 162*e* that is affixed to a lower clamping member 159 between the first side rail 132 and the second side rail 134. While FIG. 7 depicts the central actuator 162*e* as being coupled to a lower clamping member 159, it should be understood that, in other embodiments, the central actuator 162*e* may be coupled to a portion of the longitudinal frame 130 (FIG. 1A) that is centrally located between the first side rail 132 and the second rail 133, such as a central third rail or the like.

In this embodiment, the support pad 141 can be raised, lowered, folded about the pad hinge 142 or unfolded about the pad hinge 142 by actuating the various actuators 162*a*, 162*d*, and 162*e* either synchronously or independently. For example, the entire support pad 141 may be raised or lowered by simultaneously operating actuators 162*a*, 162*d*, and 162*e* to uniformly raise and/or lower the support pad 141. When the operation of the actuators 162*a*, 162*d*, and 162*e* are synchronized, the first section 141*a*, the second section 141*b*, and the pad hinge 142 of the support pad 141 are simultaneously raised and/or lowered, preventing the first section 141*a* and/or the second section 141*b* from folding about the pad hinge 142. Alternatively, the support pad 141 can be folded about the pad hinge 142 by actuating at least one of actuators 162*a*, 162*d* while actuator 162*e* is not actuated. For example, actuating actuator 162*d* causes the first section 141*a* of the support pad 141 to pivot about the pad hinge 142 as the pad hinge 142 is held in place by actuator 142*e*. In still other embodiments, the support pad 141 can be folded about the pad hinge 142 by actuating actuators 162*a*, 162*d*, and 162*e* at different rates. For example, extending actuators 162*a*, 162*d* at a rate faster than actuator 162*e* causes both the first section 141*a* and the second section 141*b* to rotate about the pad hinge 142 as the entire support pad 141 is raised in the +Z direction of the coordinate axes depicted in FIG. 7. In yet other embodiments, the support pad 141 can be folded about the pad hinge 142 by actuating actuators 162*a*, 162*d* in a first direction and by actuating actuator 162*e* in a different direction. For example, extending actuators 162*a*, 162*d* in the +Z direction of the coordinate axes depicted in FIG. 7 and retracting actuator 162*e* in the −Z direction of the coordinate axes depicted in FIG. 7 causes both the first section 141*a* and the second section 141*b* to rotate about the pad hinge 142.

As shown in FIG. 6A, the support pad 141, before vertical movement, may be at an initial height (i.e., a standard height) $H_S$ relative to the side rails 132, 134. The support pad 141 may be lowered to any height between the initial height $H_S$ and a minimum height $H_{MIN}$. In some embodiments, the minimum height $H_{MIN}$ may be, for example, when the support pad 141 contacts at least a portion of the longitudinal frame 130 (e.g., the first side rail 132, the second side rail 134, or the clamps 152, 154 coupled thereto) and is impeded from further movement. In other embodiments, the minimum height $H_{MIN}$ corresponds to the minimum stroke length of at least one of the actuators 162*a*-162*d*. The support pad 141 may be raised to any height between the initial height $H_S$ and a maximum height $H_{MAX}$. The maximum height $H_{MAX}$ generally corresponds to a maximum stroke length of at least one of the actuators 162*a*-162*d*.

Figures 1, 12B:
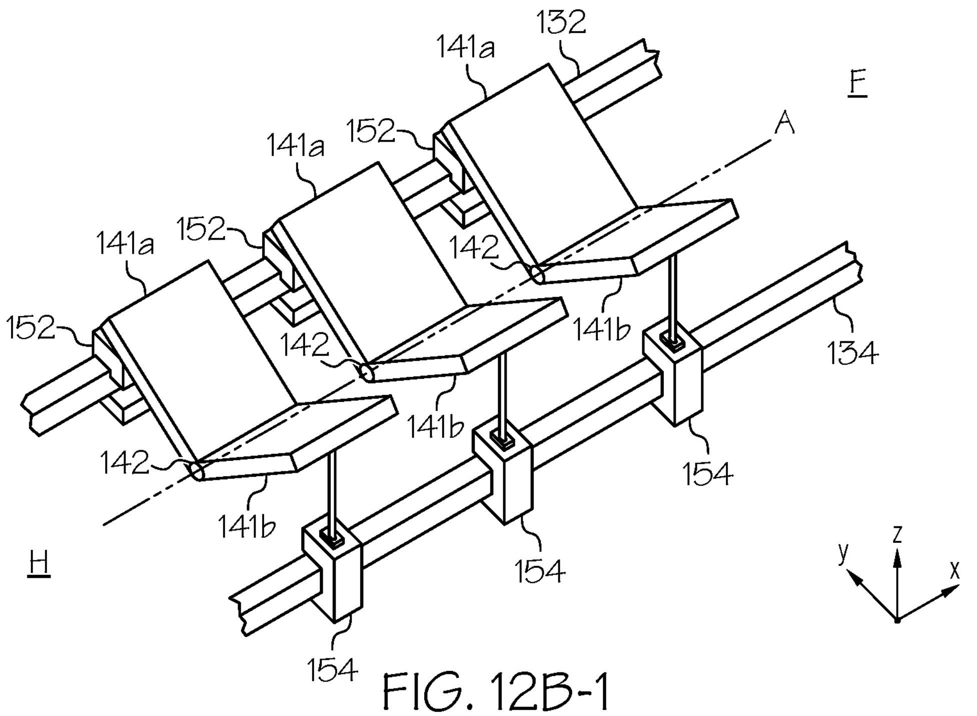
Figures 2, 12B:
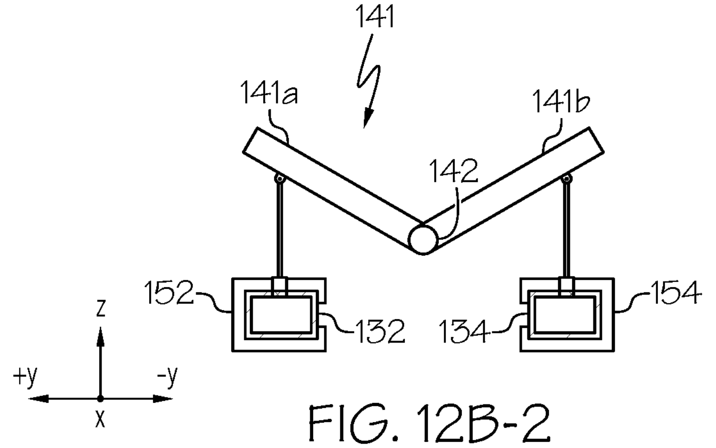
Figures 1, 12C:
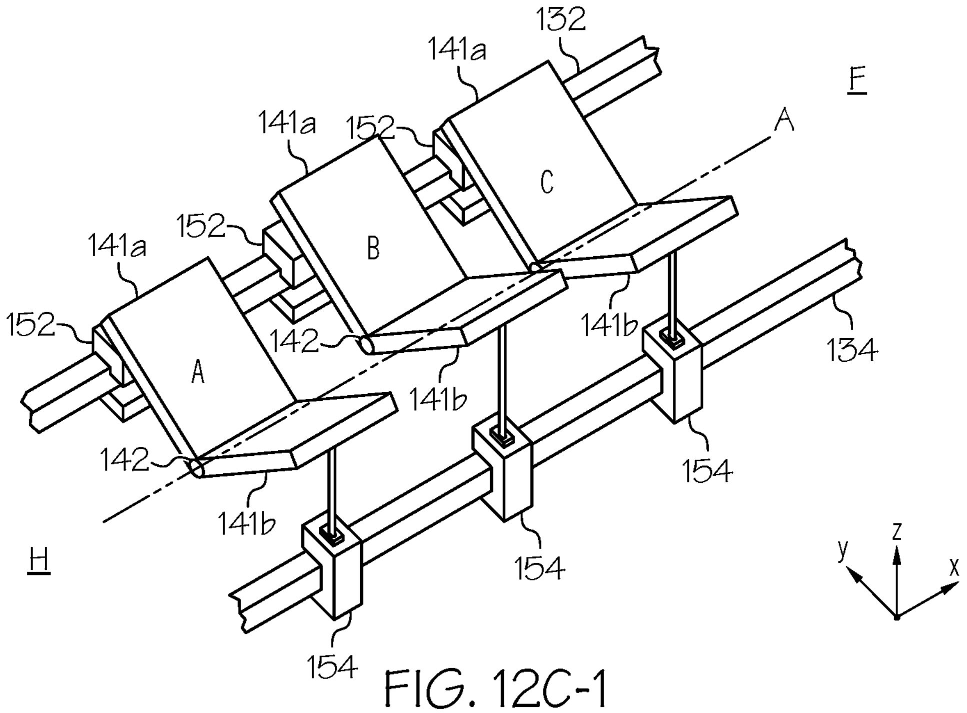
Figures 2, 12C:
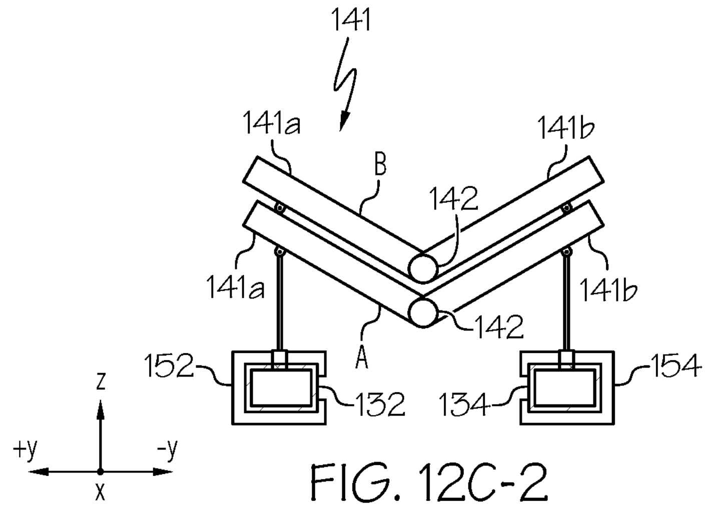
Figures 1, 12D:
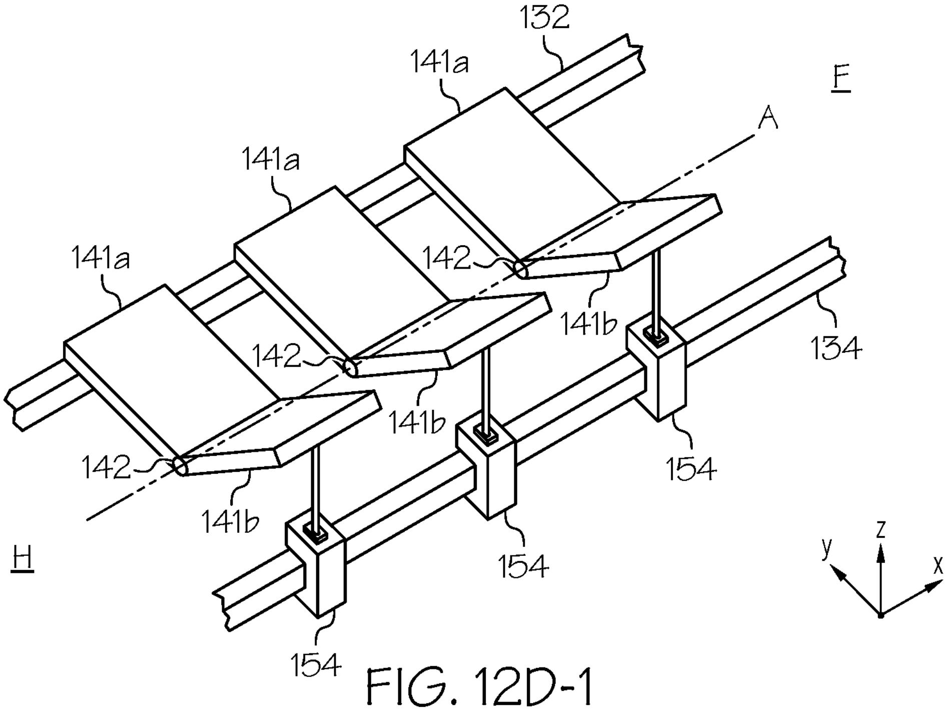
Figures 2, 12D:
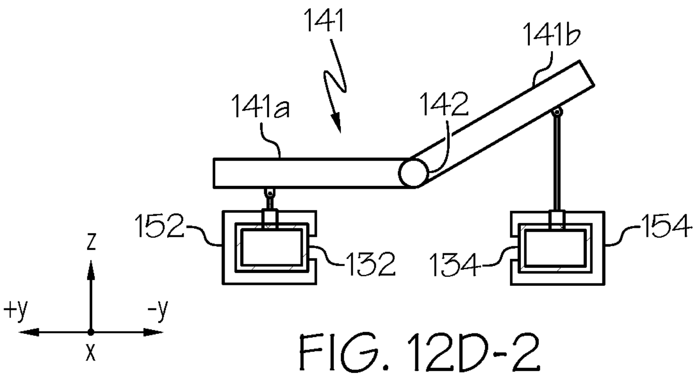

Movement of the first section 141*a* relative to the second section 141*b* or vice versa or to cause the first section 141*a* and the second section 141*b* to rotate about the pad hinge 142 as depicted in FIG. 6B and FIG. 7 is not limited by the present disclosure, and either section 141*a*, 141*b* may be moved to achieve any positioning that may be desired. Illustrative positions of the first section 141*a* and the second section 141*b* are depicted with respect to FIG. 12A-1 to FIG. 12D-2. For example, as depicted in the perspective and cross-sectional views, respectively, of FIGS. 12A-1 and 12A-2, the various first sections 141*a* and second sections 141*b* may be such that each support pad 141 is in a generally planar configuration in which each support pad 141 is a planar surface for supporting a subject. In addition, the support pads 141 are aligned in height with respect to each other such that an axis A runs through each pad hinge 142, thereby resulting in a generally planar surface across all of the support pads 141, as particularly depicted in FIG. 12A-2. In another example, as depicted in the perspective and cross-sectional views, respectively, of FIGS. 12B-1 and 12B-2, the first section 141*a* and the second section 141*b* of each of the support pads 141 may be raised vertically (e.g., in the Z direction of the coordinate axes depicted in FIGS. 12B-1 and 12B-2) relative to the pad hinge 142 of each of the support pads 141 such that each of the support pads 141 is arranged in a V shape when viewed cross-sectionally, as particularly depicted in FIG. 12B-2. Similar to the example depicted in FIGS. 12A-1 and 12A-2, the pad hinges 142 of the support pads 141 are in generally the same plane relative to one another such that an axis A runs through each pad hinge 142. In yet another example, as depicted in the perspective and cross-sectional views, respectively, of FIGS. 12C-1 and 12C-2, the first section 141*a* and the second section 141*b* of each of the support pads 141 may be raised vertically (e.g., in the Z direction of the coordinate axes depicted in FIGS. 12C-1 and 12C-2) relative to the pad hinge 142 of each respective support pad 141 to achieve the V shape as described with respect to FIGS. 12B-1 and 12B-2 when viewed cross-sectionally. In addition, a central support pad 141 B may be raised at an overall height that is higher in the vertical direction (e.g., in the Z direction of the coordinate axes depicted in FIGS. 12C-1 and 12C-2) than the height of two outer support pads 141 A, 141 C such that the axis A that passes through the respective pad hinges 142 of the outer support pads 141 A, C, but does not run through the pad hinge 142 of the central support pad 141 B, as particularly depicted in FIG. 12C-1. In yet another example, as depicted in the perspective and cross-sectional views, respectively, of FIGS. 12D-1 and 12D-2, the first section 141*a* of each of each respective support pad 141 may be raised in the vertical direction (e.g., in the Z direction of the coordinate axes depicted in FIGS. 12D-1 and 12D-2) to a height that is higher than the height of the second section 141*b* of each of the support pads 141, thereby resulting in support pads 141 having an obtuse angle shape when viewed cross-sectionally, as particularly depicted in FIG. 12D-2. It should be understood that the various configurations shown with respect to FIG. 12A-1 to FIG. 12D-2 are merely illustrative, and other configurations may be achieved by without departing from the scope of the present disclosure.

Figure 4C:
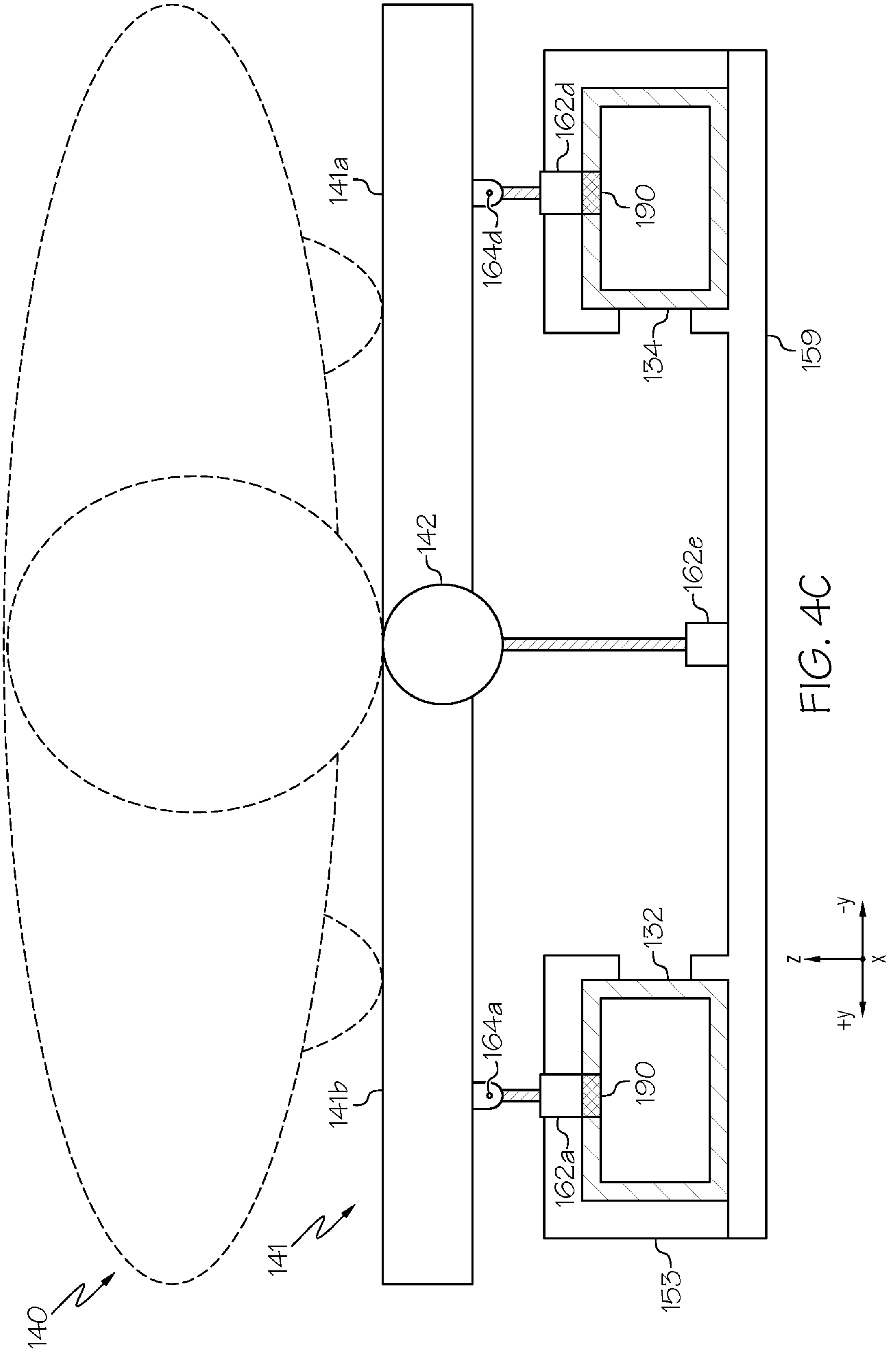
FIG. 4C schematically depicts an alternative cross-sectional view taken on lines H-H of FIGS. 2A and 2B according to one or more embodiments shown or described herein.

Referring to FIGS. 4A-4C, the clamps 152-154, the link arms 166*a*-166*b*, the pivot points 164*a*-164*f*, and the tracks 168 may generally be formed from materials that are sufficient to support the weight of the support pad 141 with a subject thereon and may further be suitable for use with a variety of radiology equipment, such as x-ray machines and the like. For example, in some embodiments, the clamps 152-154, the link arms 166*a*-166*b*, and the pivot points 164*a*-164*f* may be formed from radiolucent materials. Radiolucent materials may be any material that permits x-rays to pass through unimpeded. Nonlimiting examples of radiolucent materials include polymeric materials, carbon fiber materials, fiberglass, composite materials, resins, and the like, as well as any combination thereof. Particular nonlimiting examples of polymeric radiolucent materials may include acrylonitrile-butadiene-styrene (ABS) plastics and polyetheretherketone (PEEK) plastics. Other particular nonlimiting examples of radiolucent materials may include carbon nanotubes and graphene.

Figure 8:
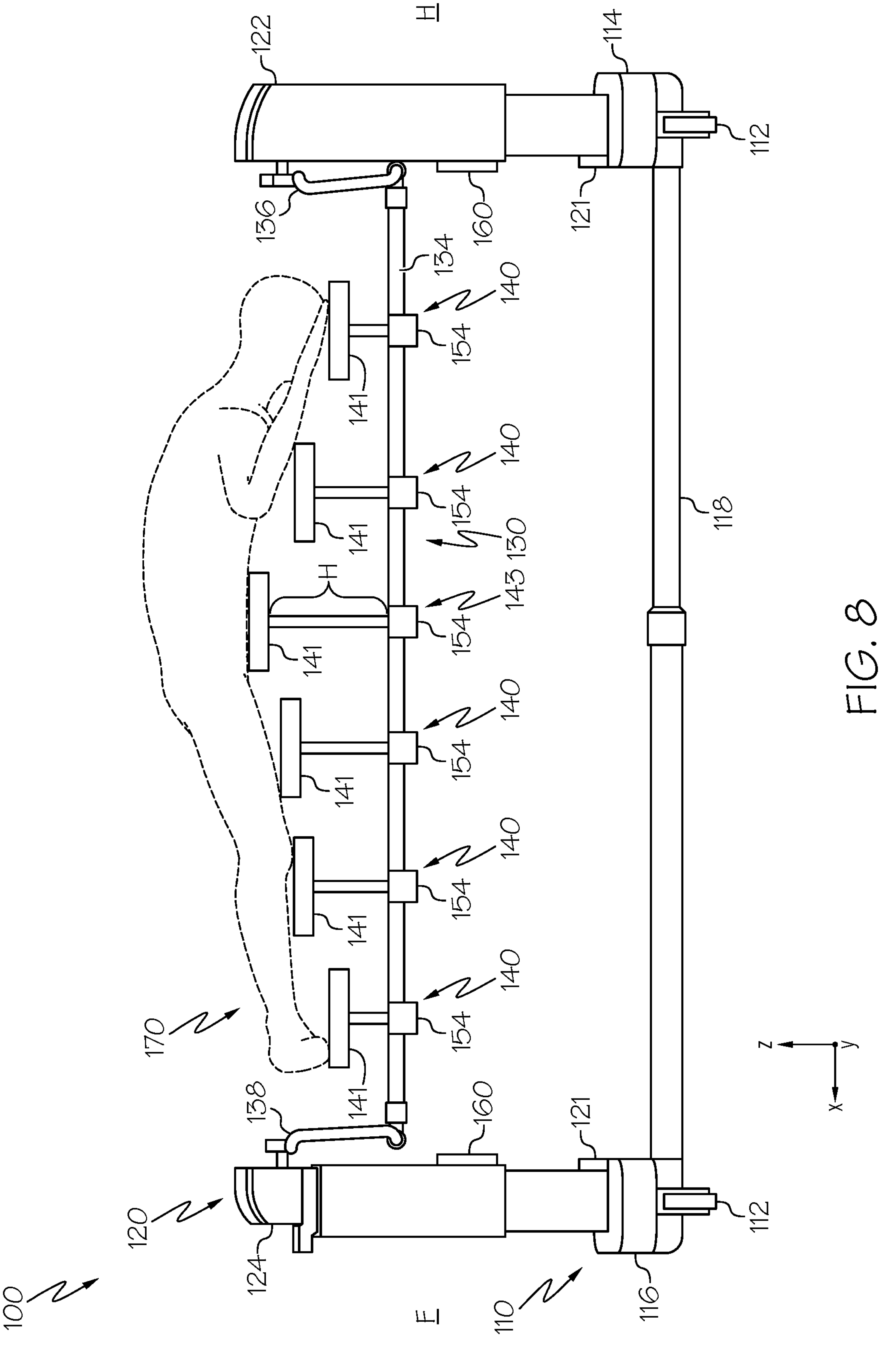
FIG. 8 schematically depicts a side view of an illustrative person support apparatus with raised support pads according to one or more embodiments shown or described herein.

Referring now to FIG. 8, in embodiments, the person support apparatus 100 may further include one radiolucent support pad assembly 143. The radiolucent support pad assembly 143 is constructed from radiolucent materials such that the radiolucent support pad assembly 143 is transparent to x-rays. The radiolucent support pad assembly 143 may include clamps (clamps 154 shown in FIG. 8) such that the radiolucent support pad assembly 143 is positionable on the side rails (side rail 134 depicted in FIG. 8) of person support apparatus 100, as described hereinabove. However, the radiolucent support pad assembly 143 does not include an actuator for adjusting a height of the support pad 141 relative to the side rails, as the actuators are generally not radiolucent. Accordingly, it should be understood that the radiolucent support pad assembly 143 generally has a fixed height relative to the side rails to which it is attached. In the embodiments described herein, the height H of the radiolucent support pad assembly 143 generally is intermediate between the minimum and maximum stroke length of the actuators associated with the support pad assemblies 140 located adjacent to it on the person support apparatus 100. As such, the adjacent support pad assemblies 140 may be raised or lowered with respect to the radiolucent support pad assembly 143 allowing for both convex and concave surface configurations. For example, the support pads 141 of the support pad assemblies 140 in FIG. 7 are positioned at elevations lower than the radiolucent support pad assembly 143 to achieve a concave surface configuration. However, it should be understood that the support pads 141 of the support pad assemblies 140 may be positioned at elevations higher than the radiolucent support pad assembly 143 to achieve a convex surface configuration.

A radiolucent support pad assembly 143 that is repositionable along the person support apparatus 100 in conjunction with the actuated support pad assemblies 140 allows for a subject to be adjustably supported on the person support apparatus 100 while still enabling radiological imaging (such as x-ray imaging) of a particular portion of the subject. That is, the radiolucent support pad assembly 143 may be positioned proximate a surgical location to support the subject without interfering with x-ray imaging of the surgical location. Moreover, constructing the radiolucent support pad assembly 143 with a fixed height H that is intermediate between the maximum and minimum stroke length of the actuators of the actuated support pad assemblies 140 permits flexibility in the positioning of the subject while still allowing for x-ray imaging. That is, the positioning of the subject on the person support apparatus 100 can be adjusted with the actuated support pad assemblies 140 relative to the radiolucent support pad assembly 143.

Referring again to FIG. 1A, the person support apparatus 100 further includes at least one actuator control unit 160 that is communicatively coupled to the actuators 162*a*-162*e* (FIGS. 4A-4C). The actuator control unit 160 is not limited by the present disclosure, and may generally be any control device. For example, the actuator control unit 160 may include a processor and a non-transitory memory storing computer readable and executable instructions, which, when executed by the processor, facilitate operation of the actuators 162*a*-162*e* (FIGS. 4A and 4C). The actuator control unit 160 sends a signal to at least one of the actuators 162*a*-162*e* (FIGS. 4A and 4C) to extend or retract, thereby causing at least a portion of the support pad 141 to raise or lower. The actuator control unit 160 is also programmed to determine a distance at which each actuator 162*a*-162*e* should extend or retract to achieve a particular positioning or height adjustment for each of the support pads 141.

Figure 9:
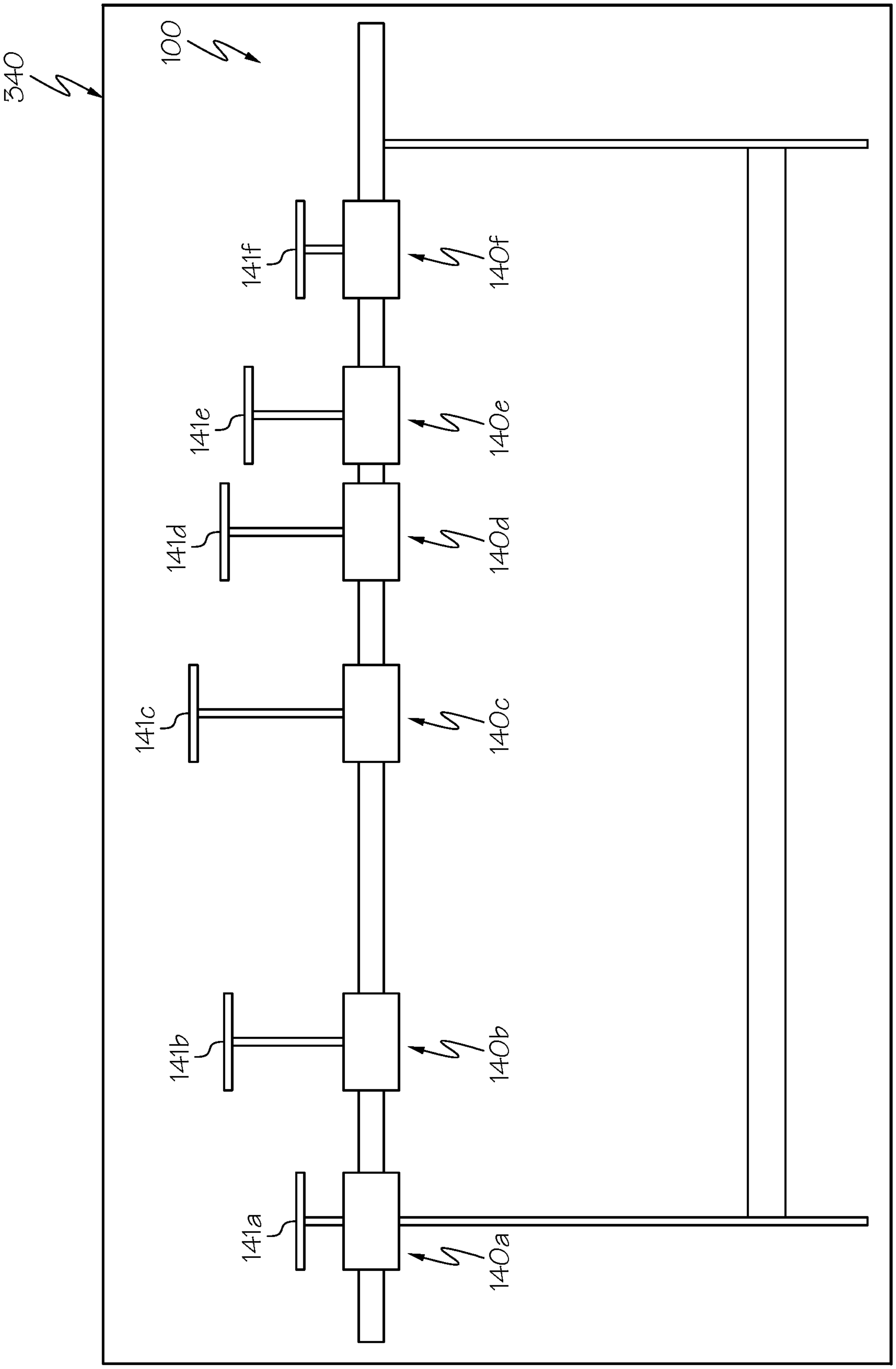
FIG. 9 schematically depicts an illustrative user interface to control the actuation of the individual support pad assemblies according to one or more embodiments shown or described herein.

Referring now to FIG. 1A and FIG. 9, the person support apparatus 100 may further include a user interface to control the actuation of the individual support pad assemblies 140 coupled to the side rails 132, 134. For example, FIG. 9 schematically depicts one embodiment of a pad user interface 340 for controlling the actuation of the individual support pad assemblies 140. The pad user interface 340 may be communicatively coupled to the actuator control unit 160 (FIG. 1A) either by wires or wirelessly. In this embodiment, the pad user interface 340 is a graphical user interface (GUI) embodied in a touch screen device. This embodiment of the pad user interface 340 includes a schematic representation of the person support apparatus 100 including support pad assemblies 140A-140F including support pads 141A-141F. A user may contact the schematic representation of the support pads 141A-141F on the GUI and "pull-up" or "pull-down" the corresponding support pad of the person support apparatus, thereby actuating the actuators of the support pad assemblies to position the support pads in the desired location.

Figure 10:
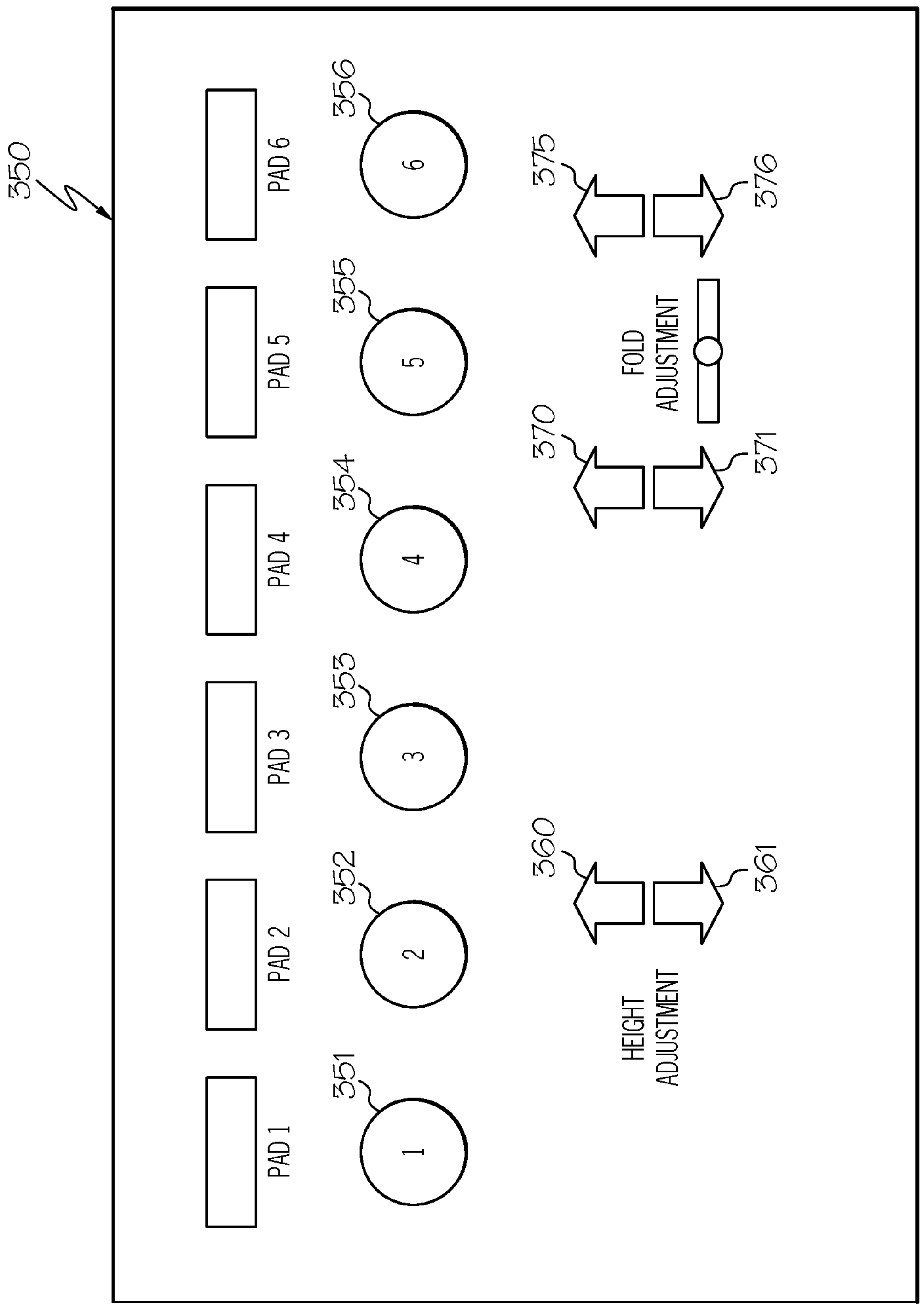
FIG. 10 schematically depicts another illustrative user interface to control the actuation of the individual support pad assemblies according to one or more embodiments shown or described herein.

Referring now to FIG. 1A and FIG. 10, in another embodiment, the person support apparatus 100 may further include a user interface to control the actuation of the individual support pad assemblies 140 coupled to the side rails 132, 134. For example, FIG. 10 schematically depicts one embodiment of a pad user interface 350 for controlling the actuation of the individual support pad assemblies 140. The pad user interface 350 may be communicatively coupled to the actuator control unit 160 (FIG. 1A) either by wires or wirelessly. The pad user interface 350 may include a plurality of pad soft keys 351, 352, 353, 354, 355, and 356 generally corresponding to the number of support pad assemblies positioned on the person support apparatus 100. The pad user interface 350 may also include height adjustment soft keys 360, 361 for adjusting the height of each support pad relative to the longitudinal support frame 130 of the person support apparatus 100. Optionally, the pad user interface 350 may include fold control soft keys 370, 371, 375, and 376 for controlling the fold adjustment of the support pad assemblies 140, such as when the support pad assemblies 140 are foldable about a pad hinge, as described herein. In embodiments, a user may select which support pad assembly is to be adjusted by toggling a corresponding pad soft key 351, 352, 353, 354, 355, or 356. Thereafter, the user can adjust the height of the support pad for the selected support pad assembly by toggling the height adjustment soft keys 360, 361 to either raise or lower the support pad. Accordingly, it should be understood that toggling the height adjustment soft keys 360, 361 actuate the corresponding actuators as described hereinabove to adjust the height of the support pad. Alternatively or additionally, the user can selectively fold portions of the support pad of the selected support pad assembly by toggling the fold control soft keys 370, 371, 375, 376. Accordingly, it should be understood that toggling the fold control soft keys 370, 371, 375, 376 actuate the corresponding actuators as described hereinabove to fold portions of the support bad about the pad hinge.

Figure 11:
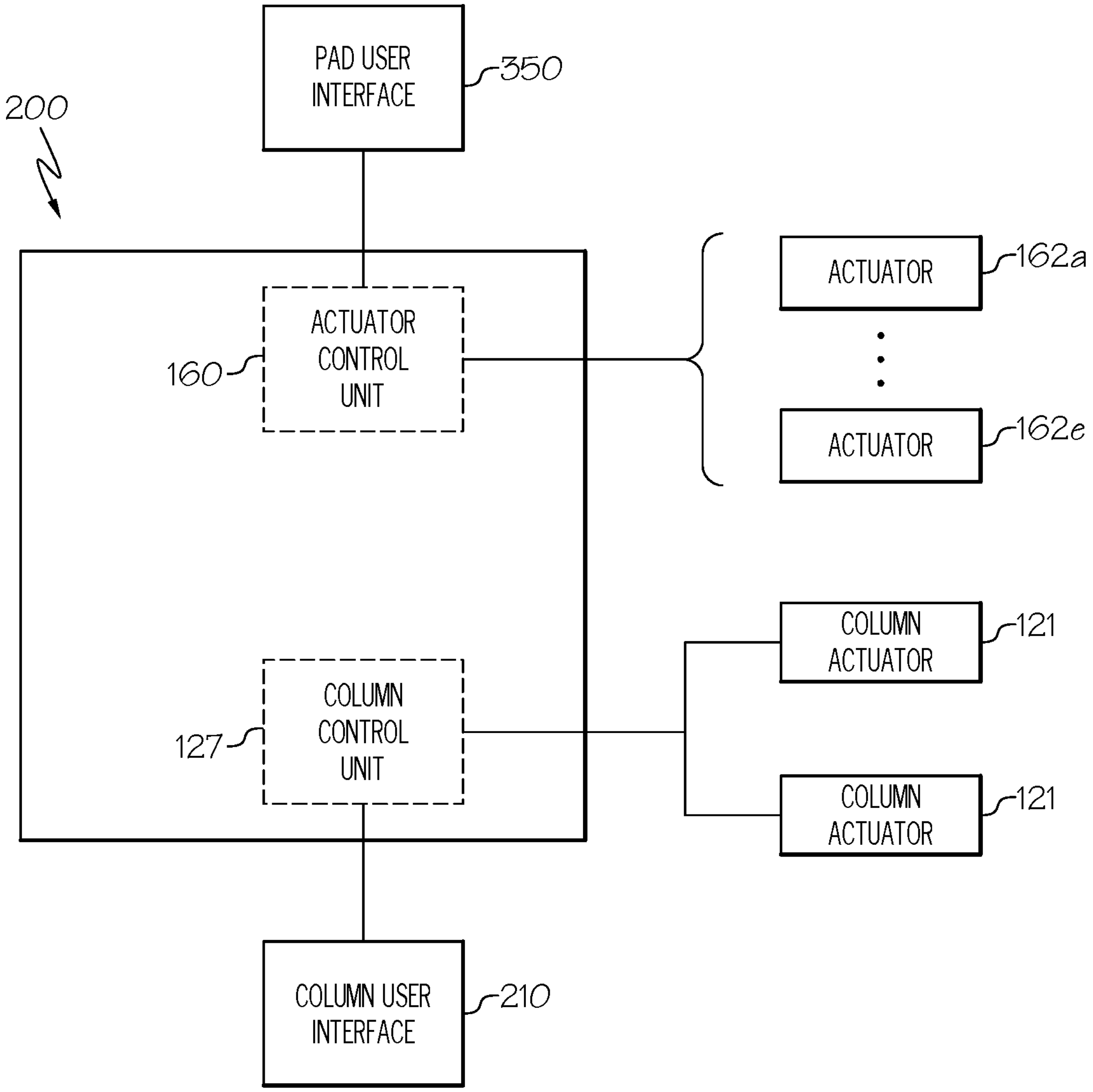
FIG. 11 schematically depicts a block diagram of various illustrative components of a person support apparatus according to one or more embodiments shown or described herein.

Referring to FIGS. 1A and 11, various control components of the person support apparatus 100 are coupled to an electronic controller 200. Particularly, the electronic controller 200 may include the actuator control unit 160 communicatively coupled to the actuators 162*a*, 162*b*, 162*c*, 162*d*, 162*e*, and a column control unit 127 communicatively coupled to the at least one column actuator 121 (two column actuators are depicted in FIG. 11). The electronic controller 200 may also include the pad user interface 350 communicatively coupled to the actuator control unit 160 and a column user interface 210 communicatively coupled to the column control unit 127. The column user interface 210 includes a device that allows a user to control the actuation of the column actuators 121.

The electronic controller 200 includes a processor and a non-transitory memory storing computer readable and executable instructions, which, when executed by the processor, facilitate operation of the various components of the person support apparatus 100. For example, the electronic controller 200 sends a signal to the at least one column actuator 121 to raise or lower the head column 122 and/or the foot column 124 in the vertical direction based on inputs received through the column user interface 210. Similarly, the electronic controller 200 sends a signal to the actuators 162*a*-162*e* to raise or lower one or more of the support pads 141 and/or fold one or more of the support pads 141 based on inputs received through the pad user interface 350.

The person support apparatus 100 depicted in FIG. 1A may be used to move, position, and/or reposition a subject supported thereon, such as during surgical procedures that require movement of the subject between various positions to complete the procedure. For example, certain spinal procedures may require a subject to be positioned such that the subject's spine is arranged in a first configuration for a first portion of the spinal procedure, and then subsequently repositioned to a second configuration for a second portion of the spinal procedure. The configurations of the spine may require the subject to be particularly oriented to achieve the desired spinal arrangement, and the person support apparatus 100 described herein may be used to achieve such particular orientations.

In some embodiments, a subject may be moved between a lateral position and a prone position, a lateral position and a supine position, and/or the like by moving one or more of the support pads as described herein. To reposition a subject, the support pads 141 of the person support apparatus 100 depicted in FIG. 1A may be selectively actuated. In some embodiments, a single support pad 141 may be selectively actuated. In other embodiments, a plurality of support pads 141 may be selectively actuated. For example, as shown in FIG. 8, each of the support pads 141 may be individually positioned vertically (e.g., raised or lowered substantially along the Z axis of the coordinate axes depicted in FIG. 8) to a particular height that may be different from the height of the remaining support pads 141 such that the subject is positioned in a desired manner. In the embodiment depicted in FIG. 8, a subject may be "broken" to open or close gaps between vertebrae in the spine of the subject by lowering the support pads 141 supporting a subject's feet and legs, lowering the support pads 141 supporting a subject's head, and raising the support pad 141 supporting a subject's midsection. In embodiments, each of the support pads 141 associated with the actuated support pad assemblies 140 may be moved relative to the radiolucent support pad assembly 143, when included. In addition, folding support pads may be used to rotate the subject (or portions or the subject) about an axis parallel to the x-axis is FIG. 8 to achieve a desired positioning for performing a surgical procedure.

While FIG. 1A depicts a person support apparatus 100 which utilizes support pad assemblies manipulated with actuators, it should be understood that alternative embodiments are contemplated and possible, such as the person support apparatus 100' depicted in FIG. 1B.

Referring now to the embodiment of the person support apparatus 100' depicted in FIG. 1B, the support deck 170' is coupled to the longitudinal frame 130 and includes one or more segments that are positioned between the head column 122 and the foot column 124 in the longitudinal direction to support a subject on the person support apparatus 100'. In the embodiment depicted in FIG. 1B, the support deck 170' includes an upper segment 172 positioned generally at or near the head end H of the person support apparatus 100'. The upper segment 172 may generally support an upper body and/or the head and arms of a subject. The support deck 170' further includes a lower segment 176 positioned generally at or near the foot end F of the person support apparatus 100'. The lower segment 176 generally supports the lower body and/or legs of a subject. The support deck 170' also includes a middle segment 174 that is positioned between the upper segment 172 and the lower segment 176 in the longitudinal direction. The middle segment 174 generally supports a torso and/or a midsection of a subject.

Each of the upper segment 172, the middle segment 174, and the lower segment 176 of the support deck 170' may have at least one planar configuration in which the respective segment 172, 174, 176 is a generally planar surface that supports a subject on the person support apparatus 100'. In some embodiments, the upper segment 172, the middle segment 174, and/or the lower segment 176 may include contoured or shaped surfaces that accommodate various portions of a subject. For example, the upper segment 172 may include a pillow portion and arm portions that accommodate a subject's head and arms, respectively. The middle segment 174 and the lower segment 176 may similarly include features and/or contours that accommodate a subject's torso and lower body, respectively.

At least one of the upper segment 172, the middle segment 174, and the lower segment 176 of the support deck 170' may include an arrangement of one or more bladders 171. The bladders 171 may be any shape or size. For example, in some embodiments, a bladder 171 may have a substantially cuboid shape or cuboid-like shape when inflated to a maximum pressure. In other embodiments, a bladder 171 may have a triangular prism or triangular prism-like shape when inflated to a maximum pressure. In some embodiments, a bladder 171 may have a first shape when deflated to a minimum pressure and a second shape when inflated to a maximum pressure.

In addition, the bladders 171 may be arranged in any manner. For example, in some embodiments, the bladders 171 may be arranged in a grid configuration. In some embodiments, the bladders 171 may be stacked on top of each other in a layered configuration such that the support deck 170' contains 2 or more layers of bladders 171 stacked on top of each other. Such a stacking of the bladders may allow for simultaneous inflation of the bladders 171, which allows a larger range of height change for a surface supporting a subject than would be possible with a single layer of bladder, as described in greater detail herein. In some embodiments, the bladders 171 may be arranged such that they provide the contoured or shaped surface that accommodates the subject. In some embodiments, the bladders 171 may be arranged adjacent to one another. In other embodiments, the bladders 171 may be spaced apart such that a space is present between bladders 171 so as to allow for the bladders 171 to expand and/or to allow for various components to pass between bladders 171.

The bladders 171 may be constructed of any material, particularly materials that are suitable for retaining a pressurized fluid therein. Illustrative materials may include, but are not limited to, rubber, various polymers such as a vinyl polymer or the like, latex materials, and combinations thereof. In some embodiments, the materials used for the bladders 171 may be suitable for use with a variety of radiology equipment, such as x-ray machines and the like. For example, in some embodiments, the bladders 171 may be formed from radiolucent materials. Radiolucent materials may be any material that permits x-rays to pass through unimpeded, such as the radiolucent materials previously described herein.

Figure 14:
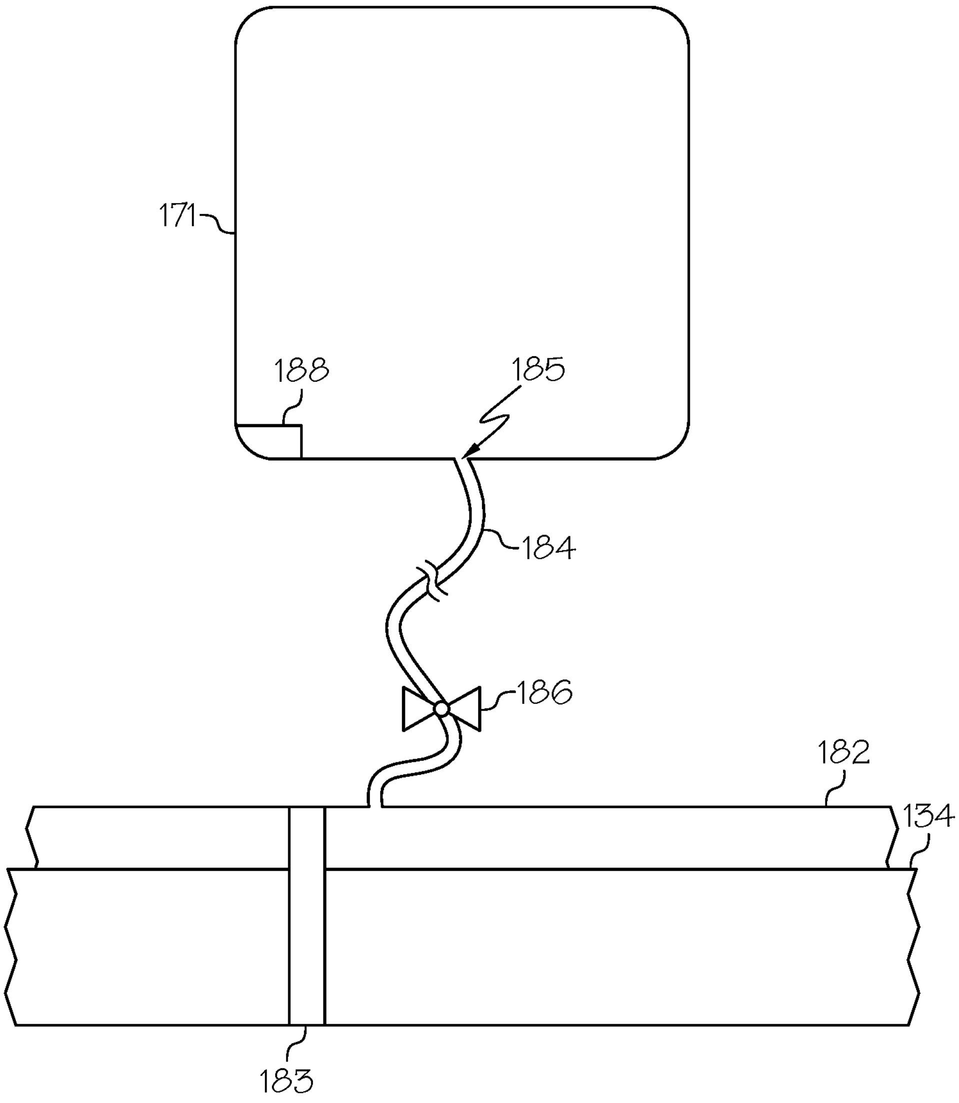
FIG. 14 schematically depicts a block diagram of illustrative fluid connectivity between a bladder and a manifold according to one or more embodiments shown or described herein.

FIG. 14 depicts an illustrative schematic diagram of a representative bladder 171 according to an embodiment. The bladder 171 may include an opening 185 that allows fluid to be pumped into or extracted from the bladder 171, thereby inflating or deflating the bladder 171. The opening 185 may be fluidly coupled to a manifold 182 via a conduit 184. A valve 186 is positioned between the manifold 182 and is selectively controllable to allow the fluid to pass through the opening 185 into the bladder 171 or out of the bladder 171. The bladder 171 may further contain a pressure sensor 188. The pressure sensor 188 may generally be coupled to each bladder 171 to monitor the pressure of the fluid within the bladder 171.

Figure 15A:
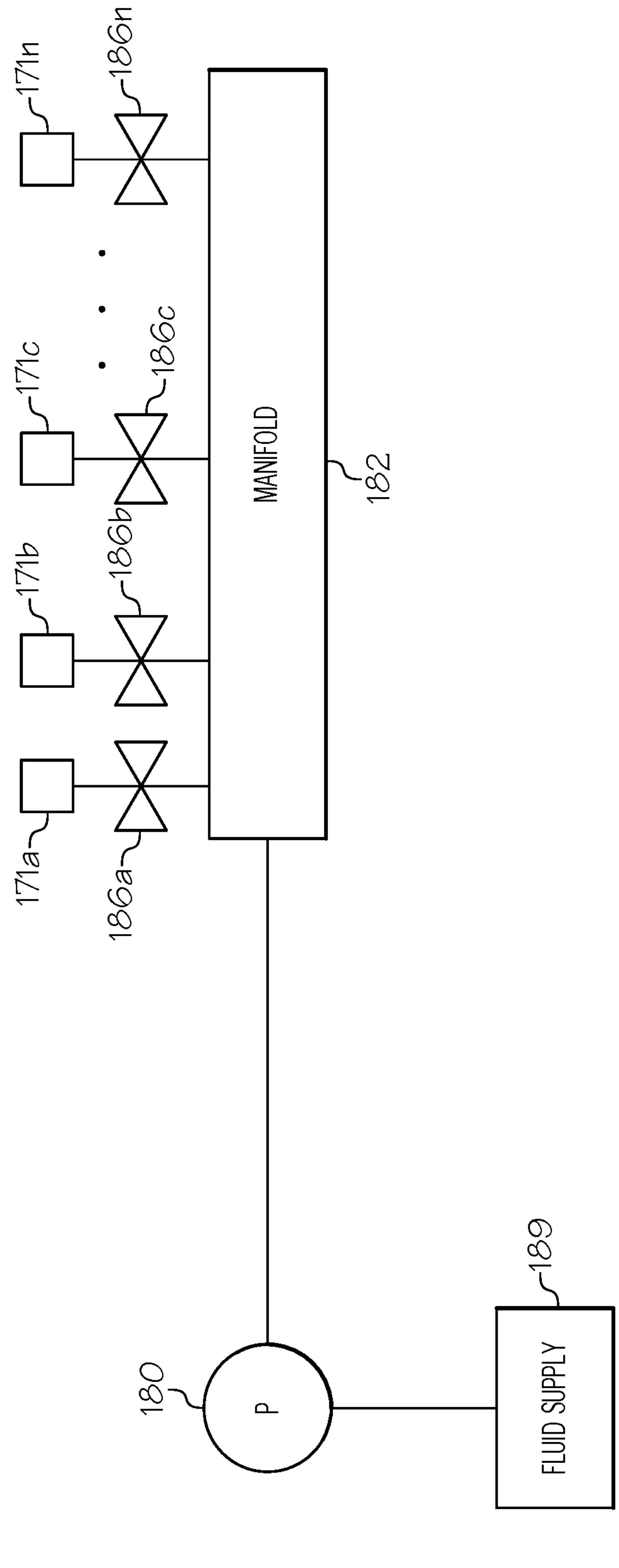
FIG. 15A schematically depicts a block diagram of illustrative fluid connectivity between various components of the person support apparatus of FIG. 1B according to one or more embodiments shown or described herein.

Referring now to FIGS. 1B and 15A, each of a plurality of bladders 171*a*-171*n* is fluidly coupled to one or more pumps 180 via the manifold 182. In the embodiment depicted in 15A, the one or more pumps 180 are each fluidly coupled to a fluid supply 189. For example, such a fluid arrangement may generally allow fluid from the fluid supply 189 to flow through the pump 180 to the manifold 182, where it is distributed to one or more of the plurality of bladders 171*a*-171*n* depending on the open or closed configuration of each of the plurality of valves 186*a*-186*n* that corresponds to a particular one of the plurality of bladders 171*a*-171*n*. In embodiments where the plurality of bladders 171*a*-171*n* are arranged in a stacked or layered configuration, the conduit 184 that fluidly couples the manifold 182 to the plurality of bladders 171*a*-171*n* may pass between certain bladders to reach other bladders.

In embodiments, the manifold 182 may be coupled to or supported by the person support apparatus 100' such that a fluid connection between the manifold and the bladders 171*a*-171*n* is possible. For example, as shown in FIGS. 13A and 13B, the manifold 182 may extend along a length of the first side rail 132 (FIG. 3B) and/or along a length of the second side rail 134 (FIG. 3A). In some embodiments, the manifold 182 may be coupled to the first side rail 132 and/or the second side rail 134 via one or more retention devices 183, such as straps, clamps, and/or the like. In other embodiments, at least a portion of the manifold 182 may be integrated within at least a portion of the longitudinal frame 130. Other locations and configurations of the manifold 182 are contemplated and understood.

The manifold 182 and the plurality of conduits 184 may generally be constructed of any material capable of passing fluid therethrough. Illustrative materials may include rubber, various plastics such as vinyl polymers or the like, latex materials, and any combination thereof. In some embodiments, the manifold 182 and the plurality of conduits 184 may be constructed of a radiolucent material, such as the radiolucent materials previously described herein.

The one or more pumps 180 may be coupled to a portion of the person support apparatus 100' or may be a standalone unit that is not coupled to the person support apparatus 100'. For example, as shown in the embodiment of FIG. 1B, pumps 180 may be coupled to the head column 122 and/or the foot column 124 of the primary support frame 120. The one or more pumps 180 are generally any component that can compress fluid, and/or direct fluid from the fluid supply 189 to the manifold 182. Nonlimiting examples of pumps include turbine pumps, peristaltic pumps, diaphragm pumps, screw pumps, syringe pumps, and centrifugal pumps. In embodiments, the pumps 180 may work in conjunction with the plurality of valves 186*a*-186*n* to provide a measurable amount of fluid to each of the bladders 171 such that each of the bladders 171 is inflated or deflated to a desired inflation level.

The fluid supply 189 may be coupled to a portion of the person support apparatus 100', may be coupled to or integrated with the one or more pumps 180, or may be a standalone unit that is fluidly coupled to the one or more pumps 180. The fluid supply 189 is generally any component that can provide fluid to the pumps 180, and is otherwise not limited by this disclosure. In a nonlimiting example, the fluid supply 189 may be a fluid intake port coupled to the pumps 180. In another embodiment, the fluid supply 189 may be a container of fluid that is fluidly coupled to the pump 180.

While FIG. 15A schematically depicts a pump 180 fluidly coupled to a fluid supply source 189 to deliver a working fluid (e.g., gas or liquid) to the bladders 171*a*-171*n* via the manifold 182, it should be understood that other embodiments are contemplated and possible. For example, the plurality of bladders 171*a*-171*n* may be coupled to one or more compressors via the manifold 182 rather than the one or more pumps 180 and fluid supply 189. Accordingly it should be understood that the one or more compressors or the one or more pumps 180 and fluid supply 189 are a fluid source for supplying a working fluid (gas or liquid) to the plurality of bladders 171*a*-171*n* via the manifold 182.

Figure 15B:
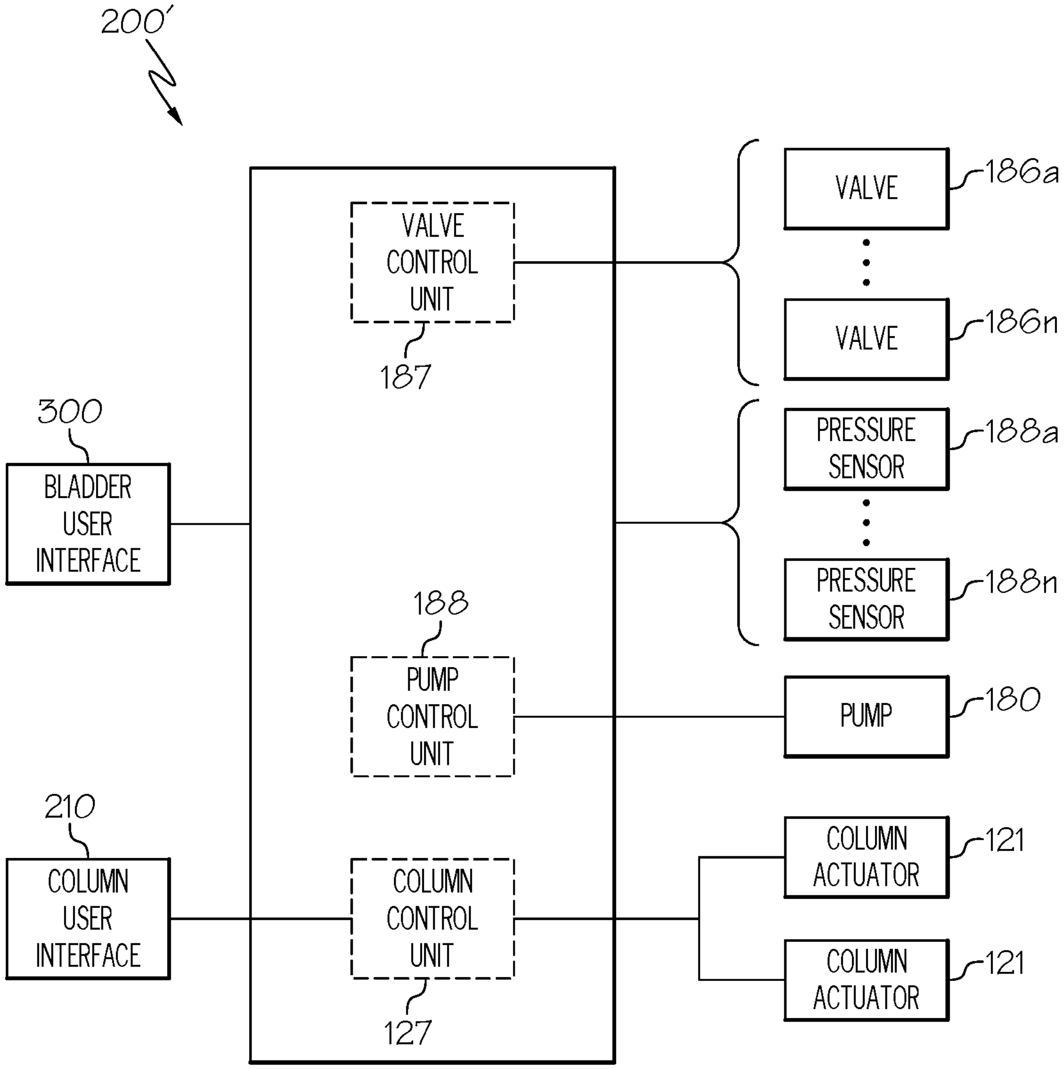
FIG. 15B schematically depicts a block diagram of illustrative communicative connectivity between various components of the person support apparatus of FIG. 1B according to one or more embodiments shown or described herein.

Referring now to FIG. 15B, in addition to being fluidly coupled to one another, various components may further be communicatively coupled to one another. In particular, an electronic controller 200' component of the person support apparatus 100' may incorporate a valve control unit 187, a pump control unit 188, and a column control unit 127. The valve control unit 187 is communicatively coupled to each of the plurality of valves 186*a*-186*n*, the pump control unit 188 is communicatively coupled to each of the one or more pumps 180 (one pump is depicted in FIG. 15B), and the column control unit 127 is communicatively coupled to the at least one column actuator 121 (two column actuators are depicted in FIG. 15B). In addition, the electronic controller 200' is communicatively coupled to each of the plurality of pressure sensors 188*a*-188*n* associated with the plurality of bladders 171*a*-171*n* (FIG. 15A). The electronic controller 200' may also include a bladder user interface 300 communicatively coupled thereto and the column user interface 210 communicatively coupled to the column control unit. As previously described herein with respect to FIGS. 1A and 11, the column user interface 210 includes a device that allows a user to control actuation of the column actuators 121.

Still referring to FIG. 15B, the electronic controller 200' includes a processor and a non-transitory memory storing computer readable and executable instructions, which, when executed by the processor, facilitate operation of the various components of the person support apparatus 100'. For example, the electronic controller 200' sends a signal to one or more of the plurality of valves 186a-186n to open or close, thereby allowing or restricting fluid passage into the respective bladder 171a-171n (FIG. 15A) coupled thereto. Similarly, the electronic controller 200' sends a signal to the pump 180 to cause the pump 180 to control movement of fluid. In addition, the electronic controller 200' receives signals from one or more of the plurality of pressure sensors 188a-188n corresponding to the sensed pressure inside each respective bladder 171a-171n (FIG. 15A) associated with the pressure sensors 188a-188n.

Figure 16:
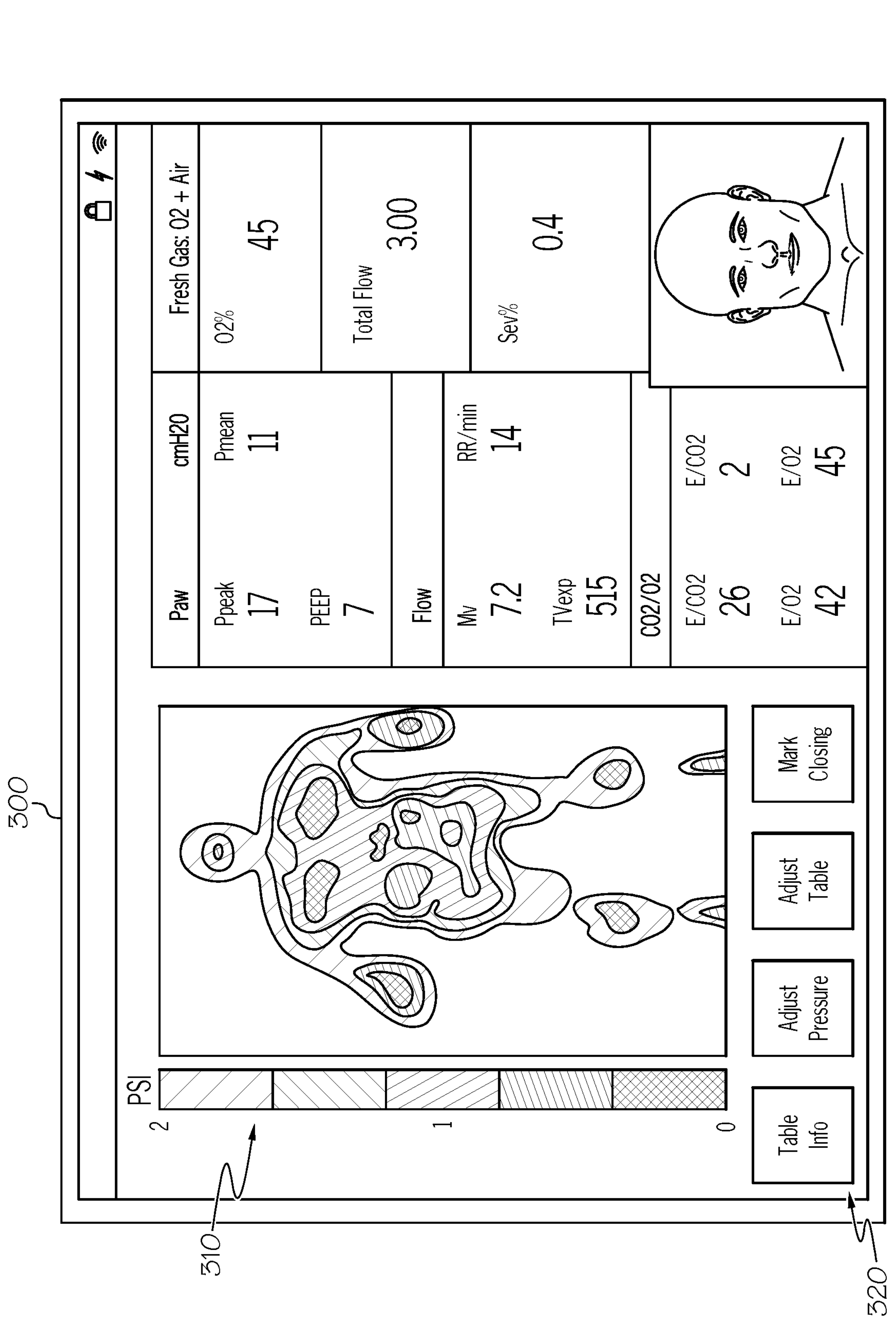
FIG. 16 schematically depicts an illustrative user interface of an electronic controller according to one or more embodiments shown or described herein.

Referring now to FIG. 1B, FIG. 15B, and FIG. 16, the person support apparatus 100' may further include a user interface to control the inflation and deflation of the bladders 171. For example, FIG. 16 schematically depicts one embodiment of a bladder user interface 300 for viewing information regarding a subject positioned on the person support apparatus 100' and/or controlling inflation of the bladders 171. The bladder user interface 300 may be communicatively coupled to the electronic controller 200', either by wires or wirelessly. In this embodiment, the bladder user interface 300 is a graphical user interface (GUI) embodied in a touch screen device. This embodiment of the bladder user interface 300 includes a schematic representation of the subject positioned on the person support apparatus 100', including a pressure map 310 indicating the an amount of sensed pressure that is applied to every portion of the subject's body that is contacting the person support apparatus 100' based on signals received via the pressure sensors 188a-188n. In addition, this embodiment of the bladder user interface 300 also includes one or more inputs 320 for adjusting the person support apparatus 100' and the various components thereof (such as the bladders 171). A user may contact the one or more inputs 320 on the GUI and direct a height increase, direct a change in subject movement, and/or direct a change in the amount of pressure applied to the subject's body at a particular location, thereby causing the valve control unit 187 to transmit signals to one or more of the valves 186a-186n to open or close, causing the pump control unit 188 to transmit signals to the one or more pumps 180, receive signals from one or more of the pressure sensors 188a-188n, and/or cause the column control unit 127 to transmit signals to the column actuators 121 to move up or down.

Figure 17:
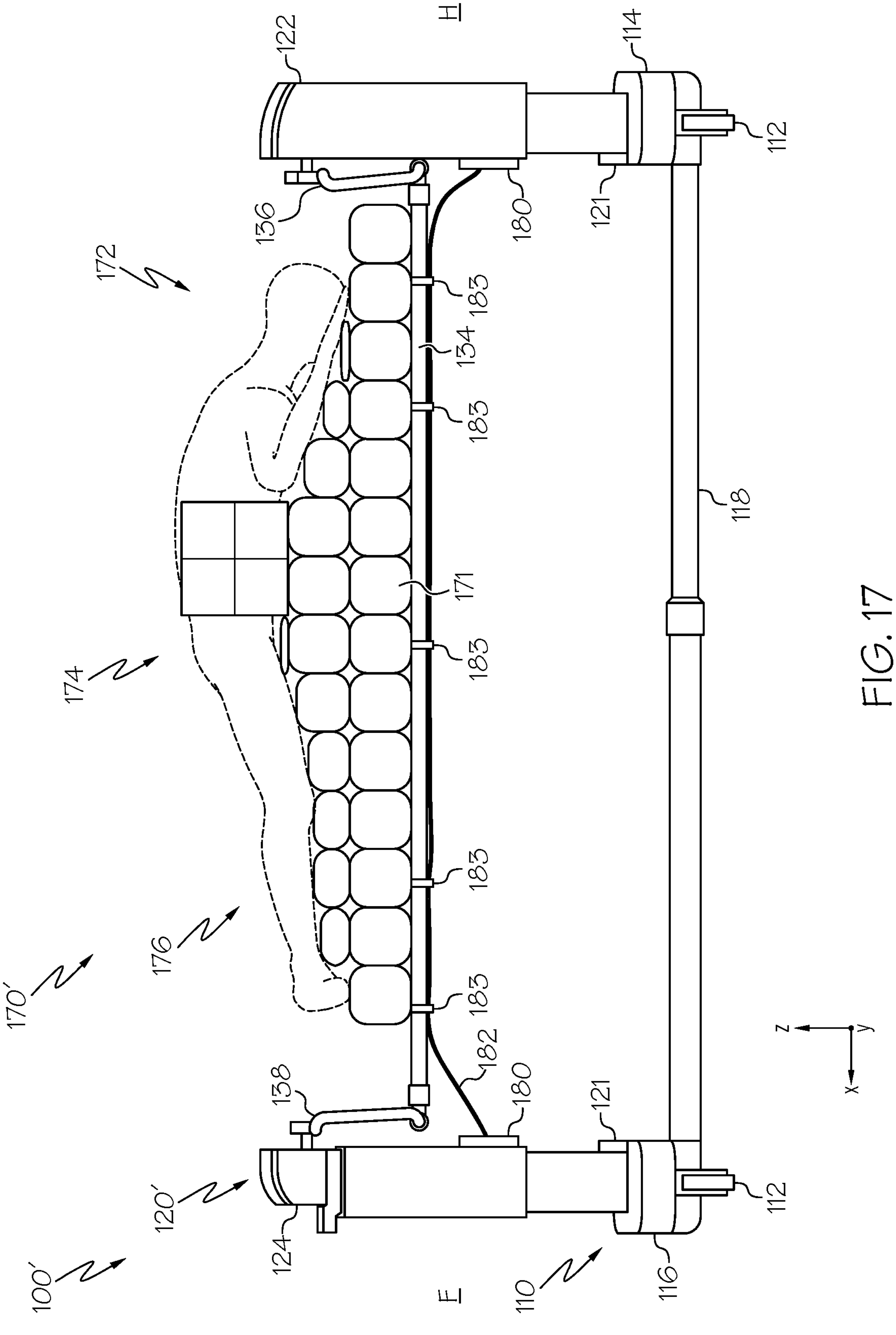
FIG. 17 schematically depicts a side view of an illustrative person support apparatus with a support deck having a plurality of expanded bladders according to one or more embodiments shown or described herein.

To reposition a subject positioned thereon, the person support apparatus 100' depicted in FIG. 1B may be directed to selectively inflate and/or deflate one or more of the bladders 171. For example, as shown in FIG. 17, each of the plurality of bladders 171 may be inflated or deflated to a particular fluid pressure therein such that the subject is positioned in a particular manner. In the embodiment depicted in FIG. 17, a subject may be "broken" to open or close gaps between vertebrae in the spine of the subject by partially inflating one or more of the bladders 171 in the lower segment 176 that support a subject's feet and legs, partially inflating one or more of the bladders 171 located in the upper segment 172 that support a subject's head and arms, and fully inflating one or more of the bladders 171 located in the middle segment 174 that support a subject's midsection, thereby causing the support deck 170' to have a surface with a convex shape. Similarly, while not depicted in FIG. 17, a subject may be broken by partially inflating one or more of the bladders 171 in the middle segment 174 and fully inflating one or more of the bladders 171 in the upper segment 172 and the lower segment 176, thereby causing the support deck 170' to have a surface with a concave shape.

Referring again to FIG. 15B, to obtain a particular positioning of the subject, the electronic controller 200' is configured to receive inputs from a user via the bladder user interface 300 regarding a desired positioning, receive signals from the plurality of pressure sensors 188a-188n regarding the sensed pressure of each of the plurality of bladders 171a-171n, and based on the inputs and the signals, determine which of the plurality of bladders 171a-171n are to be inflated or deflated and determine a specific pressure of the fluid inside of each of the plurality of bladders 171a-171n that would result in a desired inflatedness of each bladder 171. Such a determination may be based on a current positioning of the subject (determined based upon the sensed pressure in each of the bladders 171), the current inflatedness of particular bladders 171, and an amount of inflatedness necessary for each of the bladders 171 to achieve the desired positioning. That is, the electronic controller 200' may determine whether certain parts of the subject's body are to be raised, lowered, tilted, and/or the like to achieve a desired positioning, and the inflatedness of each bladder 171 that would achieve such a movement of those parts. Once the specific pressure for each of the plurality of bladders 171a-171n has been determined, the electronic controller 200' may direct the pump control unit 188 to send a signal to the one or more pumps 180 to circulate and/or compress or decompress fluid and direct the valve control unit 187 to send signals to one or more of the plurality of valves 186a-186n to open or close to allow fluid to pass therethrough until a corresponding pressure sensor 188a-188n transmit a signal that the pressure in the corresponding bladder 171a-171n is an equivalent of the determined specific pressure.

For example, referring to FIG. 15A, FIG. 15B, and FIG. 17, if the user provides inputs via the bladder user interface 300 that the desired positioning of the subject would be a convex shape as shown in FIG. 17, the electronic controller 200' may receive signals from each of the plurality of pressure sensors 188a-188n that indicate that the bladders 171a-171n corresponding thereto are in a deflated configuration. The electronic controller 200' may further determine that a bottom layer of bladders 171 should be fully inflated, that a second layer of bladders 171 in the lower segment 176 and upper segment 172 should be partially inflated, and that the second layer of bladders 171 in the middle segment 174 should be fully inflated to achieve the desired concave shape. Accordingly, the electronic controller 200' may direct the pump control unit 187 to send a signal to the one or more pumps 180 to begin pumping air into the manifold 182, and directing the valve control unit 187 to open all of the valves 186a-186n. As the fluid is pumped into the bladders 171, the electronic controller 200' may continuously receive signals from the corresponding pressure sensors 188a-188n. When the desired pressure has been reached for each bladder based on the received pressure signal, the electronic controller 200' may direct the valve control unit 187 to close the corresponding valve 186 until all of the bladders 171 are appropriately inflated and the corresponding valves 186a-186n are closed. The electronic controller 200' may then direct the pump control unit 188 to send a signal to the one or more pumps 180 to cease pumping fluid.

Inflating or deflating each of the bladders 171 may generally be completed to obtain a precise pressure in each of the bladders 171 such that a precise positioning of the subject is possible. Accordingly, it should be understood that the electronic controller 200' does not merely cause each of the plurality of bladders 171a-171n to inflate to a maximum inflation level or deflate to a minimum inflation level whenever bladder inflation is necessary. Rather, by continuously receiving pressure signals from the pressure sensors 188a-

188*n* and controlling the valves 186*a*-186*n*, a precise inflatedness of each of the bladders 171 may be achieved. Moreover, in embodiments where the bladders 171 are arranged in a layered configuration, inflation or deflation of certain stacked bladders 171 allows for even more precise control over the positioning of the subject because the stacked bladders 171 can each individually be inflated to a precise pressure level, that, when combined with the other layers of bladders adjacent thereto, allows for greater movement and positioning of the subject positioned thereon.

Control of the inflatedness of each one of the plurality of bladders 171 may generally allow for an overall height adjustment of the subject supported thereon, as well as a tilting of the surface supporting the subject on an axis parallel to the X-axis of the coordinate axes depicted in FIG. 17.

Figure 18A:
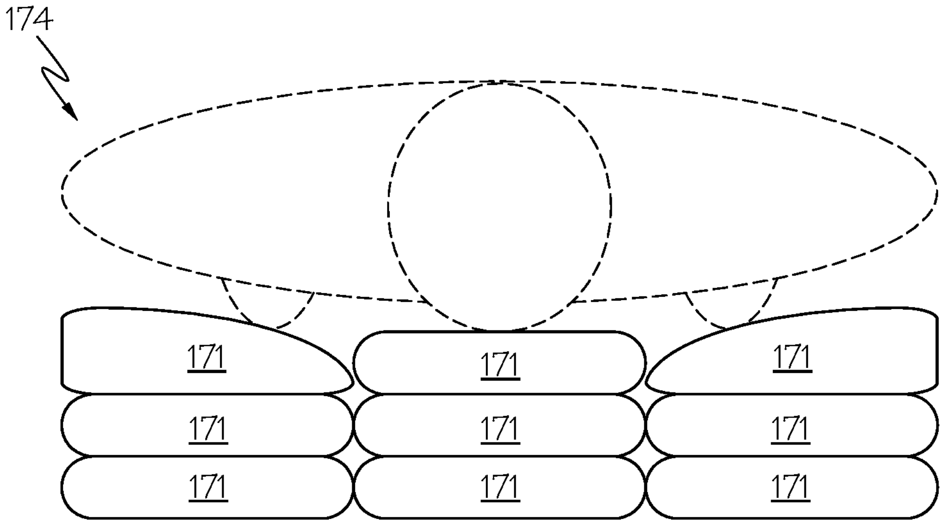
FIG. 18A schematically depicts a cross-sectional view of an illustrative support deck having a plurality of uninflated bladders according to one or more embodiments shown or described herein.
Figure 18B:
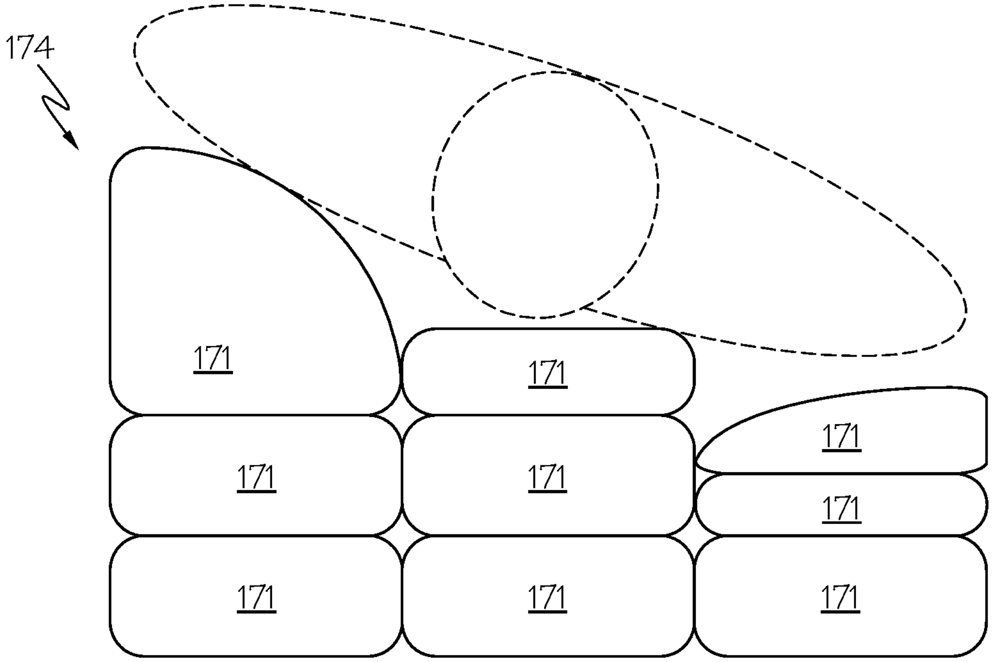
FIG. 18B schematically depicts a cross-sectional view of an illustrative support deck having a plurality of fully inflated bladders according to one or more embodiments shown or described herein.

In addition, in some embodiments, a subject may be moved between a lateral position and a prone position, a lateral position and a supine position, and/or the like by inflating one or more particularly positioned bladders 171. For example, as shown in FIG. 18A, a subject may be positioned in a prone position between a plurality of angled bladders 171 that are arranged on either side of the subject before the bladders 171 are inflated or deflated. Referring to FIG. 18B, the subject may be moved to a generally lateral position by inflating one or more of the angled bladders 171 on one side of the subject, deflating one or more of the angled bladders 171 on another side of the subject, and/or inflating one or more of the bladders 171 positioned beneath the subject. As a result, inflation of bladders on a first side of the subject and deflation (or lack of inflation) of bladders on a second side of the subject may cause the subject to move from a supine or prone position to a lateral position.

Referring again to FIG. 1B, FIG. 15A, FIG. 15B, and FIG. 16, occasionally, a subject may develop injuries as a result of extended periods of pressure that is placed on the subject's body. For example, some surgical procedures make take several hours to complete and therefore the subject may remain in the same positioning for hours at a time. As a result, the subject may develop pressure ulcers on certain areas of his/her body. To alleviate such pressure and decrease the potential for injury due to long periods of constant pressure, the person support apparatus 100' may control the inflation of the bladders 171*a*-171*n* to reduce or relieve the pressure applied to those areas. In some embodiments, the electronic controller 200' may continuously receive pressure signals from each of the plurality of pressure sensors 188*a*-188*n* and determine the amount of pressure being applied to the subject's body by the particular bladder 171 associated therewith. The amount of pressure applied to the subject's body may be determined by recording an initial pressure of the fluid in each bladder 171 before the subject is placed thereon, determining the change in pressure of the fluid in each bladder 171 due to compressive forces that result when the subject is placed on the person support apparatus 100', and calculating the pressure applied to the subject's body based on the change. In some embodiments, the electronic controller 200' may display pressure data received from the pressure sensors 188*a*-188*n* in a graphical format via the pressure map 310 displayed on the bladder user interface 300. For example, as shown in the bladder user interface 300 in FIG. 16, the pressure map 310 displays the amount of sensed pressure that is applied to every portion of the subject's body that is contacting the person support apparatus 100'. If a user determines that an excessive amount of pressure is being applied to a particular portion of the subject's body (e.g., excessive pressure on the hip), the user may select an input option 320 that indicates to the electronic controller 200' that the pressure should be reduced. The electronic controller 200' may, in turn, direct the valve control unit 187 to transmit a signal to the corresponding valve(s) 186 to open and/or direct the pump control unit 188 to transmit a signal to the one or more pumps 180 to cause fluid to be removed from the corresponding bladders 171.

Figure 19:
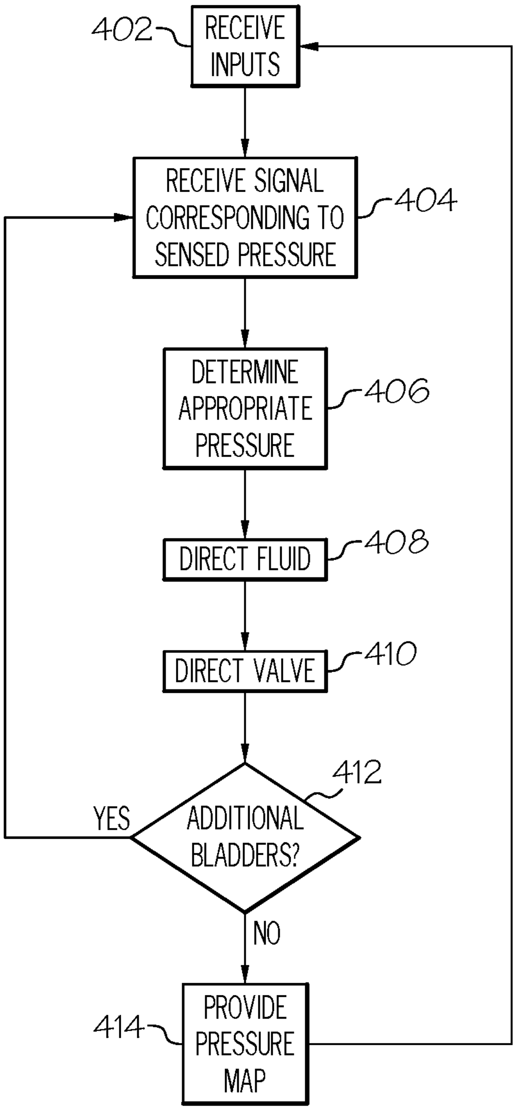
FIG. 19 schematically depicts a flow diagram of an illustrative method of determining pressure in a plurality of bladders and adjusting the pressure according to one or more embodiments shown or described herein.

The electronic controller 200' may contain programming instructions stored on a non-transitory, computer readable storage medium for executing various processes as described hereinabove. For example, the flow diagram illustrated in FIG. 19 shows the various processes as illustrative programming instructions. Referring to FIG. 1B, FIG. 15A, FIG. 15B, and FIG. 19, the electronic controller 200' may receive inputs in step 402. The inputs may include inputs that are received from the user via the bladder user interface 300 to move, position, or adjust a subject.

The electronic controller 200' may determine the current pressure in a particular bladder 171 by receiving one or more signals that correspond to the sensed pressure in step 404. The signals may generally be received from a corresponding pressure sensor 188*a*-188*n* associated with the bladder 171*a*-171*n*. The electronic controller 200' may determine an appropriate pressure for a particular bladder 171 in step 406. Such a determination may be a pressure sufficient to expand or contract the bladder 171 to a desired shape for subject movement, to alleviate pressure at a contact point between the bladder 171 and a subject, and/or the like. In addition, such a determination may be made based on the signal received in step 404 relating to the sensed pressure.

In step 408, the electronic controller 200' may direct fluid to or from the bladder 171 via the valve control unit 187 (controlling the valve 186 associated with the bladder 171) and the pump control unit 188 (controlling the one or more pumps 180) based upon the determined pressure in step 406. For example, if additional pressure is needed, the electronic controller 200' may direct fluid toward the bladder 171. In contrast, if less pressure is needed, the electronic controller 200' may direct fluid away from the bladder 171.

In step 410, the electronic controller 200' may determine whether additional bladders 171 should be adjusted for pressure, and if so, the process may repeat at step 404 until all bladders 171 in need of adjustment based on the inputs have been adjusted. In some embodiments, the processes may be completed concurrently for each of the plurality of bladders 171. If no additional bladders 171 need be adjusted, the electronic controller 200' may provide the pressure map 310 via the bladder user interface 300 in step 412 and, optionally, may further receive one or more inputs from a user by returning to step 402.

SPECIFIC EMBODIMENTS

The embodiments below are specific embodiments that are provided for illustrative purposes only and are not intended to limit the scope of the various embodiments described elsewhere herein.

In various embodiments, a person support apparatus comprises a base frame, a longitudinal frame coupled to the base frame and extending in a longitudinal direction, and a support deck supported on the longitudinal frame, wherein the support deck is adjustable from a planar configuration to a concave configuration or a convex configuration. The support deck may include a support pad assembly comprising one or more clamps that couple to the person support apparatus, each one of the one or more clamps comprising at least one actuator, and a support pad coupled to the at least one actuator, the at least one actuator raising and lowering the support pad with respect to the longitudinal frame. The support pad assembly may be a radiolucent support pad assembly having a fixed height relative to the longitudinal frame. The longitudinal frame may comprise a first side rail and a second side rail, and the one or more clamps may comprise a first clamp coupled to the first side rail and a second clamp coupled to the second side rail. The person support apparatus may further comprise an actuator control unit communicatively coupled to each one of the at least one actuator, wherein the actuator control unit comprises a processor and a non-transitory memory storing computer readable and executable instructions, which, when executed by the processor, facilitate operation of the at least one actuator. The support deck may comprise a plurality of bladders arranged in a layered configuration and a pressure of each one of the plurality of bladders is individually adjustable. Each one of the plurality of bladders may comprise a pressure sensor. The person support apparatus may further comprise a manifold fluidly coupled to each one of the plurality of bladders; a pump fluidly coupled to the manifold; and a fluid supply fluidly coupled to the pump, wherein the pump directs fluid from the fluid supply to the manifold for distribution to each one of the plurality of bladders. The person support apparatus may further comprise a plurality of valves wherein each one of the plurality of valves is fluidly coupled between the manifold and a corresponding one of the plurality of bladders such that each one of the plurality of valves controls a flow of fluid between the manifold and each one of the plurality of bladders.

In various embodiments, a person support apparatus comprises a base frame; a longitudinal frame supported by the base frame extending in a longitudinal direction; and a support pad assembly supported on the longitudinal frame, the support pad assembly comprising: one or more clamps that couple to the person support apparatus, wherein each of the one or more clamps comprises at least one actuator, and a support pad coupled to the at least one actuator, the at least one actuator raising and lowering the support pad with respect to the longitudinal frame. A primary support frame may be supported by the base frame, the primary support frame extending upward from the base frame in a vertical direction and supporting the longitudinal frame. Each one of the one or more clamps may comprise a plurality of actuators. The at least one actuator may be a pneumatic actuator or a hydraulic actuator. At least one of the one or more clamps may be a C shaped clamp having an opening receiving the longitudinal frame and one or more lips that extend toward the opening and secure the C shaped clamp to the longitudinal frame. At least one of the one or more clamps may comprise a first clamp portion and a second clamp portion; and the first clamp portion is joinable to the second clamp portion to secure the clamp to the longitudinal frame. The person support apparatus may further comprise a link arm extending between the at least one actuator and a pivot point coupled to the support pad such that the pivot point allows the link arm to rotate relative to the support pad. The link arm may be coupled to the support pad via a track that allows the pivot point to slide along a length of the track. The support pad may comprise a pad hinge about which the support pad folds. The one or more clamps may be constructed from radiolucent materials. An actuator control unit may be communicatively coupled to the at least one actuator via one or more quick disconnect slots.

In various embodiments, a person support apparatus comprises a base frame; a longitudinal frame supported by the base frame and extending in a longitudinal direction; a support pad supported on the longitudinal frame; and a means for adjusting a position of the support pad relative to the longitudinal frame. The support pad may comprise a pad hinge dividing the support pad into a first section and a second section, and the means may further comprise a means for pivoting the first section up or down relative to the second section. The support pad may be a radiolucent support pad having a fixed height relative to the longitudinal frame. The person support apparatus may further comprise a control unit communicatively coupled to the means, wherein the control unit comprises a processor and a non-transitory memory storing computer readable and executable instructions which, when executed by the processor, facilitate operation of the means.

In various embodiments, a support pad assembly for a person support apparatus comprises: one or more clamps that couple to the person support apparatus, wherein each one of the one or more clamps comprises at least one actuator; and a support pad coupled to the at least one actuator, the at least one actuator changing a position of the support pad relative to the one or more clamps. The support pad assembly may further comprise an actuator control unit communicatively coupled to the at least one actuator, wherein the actuator control unit comprises a processor and a non-transitory memory storing computer readable and executable instructions, which, when executed by the processor, facilitate operation of the at least one actuator. The actuator control unit may be communicatively coupled to the at least one actuator via a quick disconnect slot located on the person support apparatus.

In various embodiments, a person support apparatus comprises: a base frame; a plurality of bladders supported by the base frame; a fluid source coupled to each one of the plurality of bladders; and an electronic controller communicatively coupled to the fluid source, wherein the electronic controller comprises a processor and a non-transitory memory storing computer readable and executable instructions which, when executed by the processor, cause the processor to: receive one or more inputs corresponding to at least one of a desired subject positioning and a desired pressure to be placed on at least a portion of a subject's body, determine a pressure for each of the plurality of bladders that corresponds to the received one or more inputs, and direct a fluid from the fluid source to be added to or removed from each one of the plurality of bladders based upon the determined pressure. The plurality of bladders may be arranged in a grid configuration. The plurality of bladders may be arranged in a layered configuration. Each one of the plurality of bladders may comprise a pressure sensor that is communicatively coupled to the electronic controller. The non-transitory memory may further store computer readable and executable instructions which, when executed by the processor, cause the processor to: receive one or more pressure inputs from the pressure sensor; and determine a pressure of a bladder corresponding to the pressure sensor. The person support apparatus may further comprise: a manifold fluidly coupled between the fluid source and each one of the plurality of bladders; and a plurality of valves fluidly coupled between the manifold and a corresponding one of the plurality of bladders, wherein the plurality of valves are communicatively coupled to the electronic controller. The non-transitory memory may further store computer readable and executable instructions which, when executed by the processor, cause the processor to transmit one or more signals to each one of the plurality of valves that causes each one of the plurality of valves to open or close. The person support apparatus may further comprise a user interface, wherein the non-transitory memory stores computer readable and executable instructions which, when executed by the processor, cause the processor to direct the user interface to provide a pressure map indicating an amount of pressure placed on the subject's body by one or more of the plurality of bladders.

In various embodiments, a person support apparatus comprises: a base frame; and a plurality of bladders arranged in a layered configuration and supported by the base frame, wherein a fluid pressure of each one of the plurality of bladders is adjustable. The person support apparatus may further comprise a manifold fluidly coupled to each one of the plurality of bladders; a plurality of valves, each one of the plurality of valves fluidly coupled between the manifold and a corresponding one of the plurality of bladders; a pump fluidly coupled to the manifold; a fluid supply fluidly coupled to the pump; and an electronic controller communicatively coupled to each of the plurality of valves and the pump, wherein the electronic controller directs at least one of the plurality of valves and the pump to adjust the fluid pressure in each one of the plurality of bladders.

It should now be understood that the person support apparatuses according to the present disclosure cause a support deck to move to reposition a subject supported thereon. The support deck may comprise one or more support pads, or alternatively, a plurality of adjustable bladders. As such, the one or more support pads are movable or the plurality of bladders are adjustable such that, when a subject is supported by the person support apparatuses, the subject can be moved, adjusted, or repositioned. In addition, when the support deck contains a plurality of bladders, the bladders can be adjusted to alleviate pressure that is applied to the subject's body during long surgical procedures or the like. Such movement, adjustment, repositioning, and pressure alleviation may be completed in a manner that does not require personnel to breach the sterile field surrounding the subject to adjust the subject, thereby avoiding potential mishandling and infection issues.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A support pad assembly for a person support apparatus, the support pad assembly comprising:

a clamp that couples to a side rail of the person support apparatus via a clamping feature;

a first actuator coupled to the clamp and actuable to extend in a first direction that is orthogonal to a longitudinal direction of the person support apparatus;

a second actuator coupled to the clamp and actuable to extend in a second direction that is orthogonal to the longitudinal direction and the first direction; and a support pad comprising a pad hinge about which the support pad is folded, the pad hinge dividing the support pad into a first section and a second section, wherein the first section or the second section of the support pad is coupled to the first actuator and pivotably coupled to the second actuator via a link arm, and wherein the first and second actuators, when extended, raise the first section or the second section of the support pad relative to the pad hinge and when retracted, lower the first section or the second section of the support pad relative to the pad hinge.

2. The support pad assembly of claim 1, wherein the side rail is a first side rail, the clamp is a first clamp, the clamping feature is a first clamping feature, and the support pad assembly further comprises a second clamp that couples to a second side rail of the person support apparatus via a second clamping feature.

3. The support pad assembly of claim 2, wherein the link arm is a first link arm and the second clamp comprises:

a third actuator coupled to the second clamp and actuable to extend in the first direction, and a fourth actuator coupled to the second clamp and actuable to extend in a third direction that is opposite the second direction, wherein the first section or the second section of the support pad is coupled to the third actuator and pivotably coupled to the fourth actuator via a second link arm.

4. The support pad assembly of claim 1, wherein a first end of the link arm is coupled to the second actuator at a first pivot point and a second end of the link arm coupled to the first section or the second section of the support pad at a second pivot point.

5. The support pad assembly of claim 4, wherein the second pivot point is disposed and movable within a track coupled to the first section or the second section of the support pad.

6. The support pad assembly of claim 1, wherein the clamp is a C shaped clamp having an opening and one or more lips that extend towards the opening, the side rail being received within the opening.

7. The support pad assembly of claim 1, wherein the clamp comprises a first clamp portion and a second clamp portion that is separable from the first clamp portion, the first and second clamp portions being joinable together around the side rail.

8. The support pad assembly of claim 1, wherein the clamp comprises a first clamp portion and second clamp portion hingedly coupled to the first clamp portion and movable from an open position to a closed position, the side rail being received by the clamp when in the open position.

9. The support pad assembly of claim 1, further comprising an actuator control unit communicatively coupled to the first and second actuators, wherein the actuator control unit is configured to facilitate operation of the first and second actuators.

10. The support pad assembly of claim 1, wherein each one of the first actuator and the second actuator is a linear actuator, a hydraulic actuator, a pneumatic actuator, or an electromechanical actuator.

11. The support pad assembly of claim 1, further comprising an actuator control unit communicatively coupled to at least one of the first and second actuators.

12. The support pad assembly of claim 1, wherein the clamp is formed from radiolucent materials.

13. A person support apparatus, comprising:

a base frame;

a longitudinal frame supported by the base frame and extending in a longitudinal direction, the longitudinal frame comprising a side rail; and a support pad assembly supported on the longitudinal frame, the support pad assembly comprising:

a clamp that couples to the side rail via a clamping feature, a first actuator coupled to the clamp and actuable to extend in a first direction that is orthogonal to the longitudinal direction, a second actuator coupled to the clamp and actuable to extend in a second direction that is orthogonal to the longitudinal direction and the first direction, and a support pad comprising a pad hinge about which the support pad is folded, the pad hinge dividing the support pad into a first section and a second section, wherein the first section or the second section of the support pad is coupled to the first actuator and pivotably coupled to the second actuator via a link arm, and wherein the first and second actuators, when extended, raise the first section or the second section of the support pad about the pad hinge relative to the longitudinal frame and when retracted, lower the first section or the second section of the support pad about the pad hinge relative to the longitudinal frame.

14. The person support apparatus of claim 13, wherein the side rail of the longitudinal frame is a first side rail and the longitudinal frame further comprises a second side rail.

15. The person support apparatus of claim 14, wherein the clamp is a first clamp, the clamping feature is a first clamping feature, and the support pad assembly further comprises a second clamp that couples to the second side rail via a second clamping feature.

16. The person support apparatus of claim 15, wherein the link arm is a first link arm and the second clamp comprises:

a third actuator coupled to the second clamp and actuable to extend in the first direction, and a fourth actuator coupled to the second clamp and actuable to extend in a third direction that is opposite the second direction, wherein the first section or the second section of the support pad is coupled to the third actuator and pivotably coupled to the fourth actuator via a second link arm.

17. The person support apparatus of claim 13, wherein a first end of the link arm is coupled to the second actuator at a first pivot point and a second end of the link arm coupled to the first section or the second section of the support pad at a second pivot point.

18. The person support apparatus of claim 17, wherein the second pivot point is disposed and movable within a track coupled to the first section or the second section of the support pad.

19. The person support apparatus of claim 13, wherein the clamp is repositionable along a length of the side rail.

20. A person support apparatus, comprising:

a base frame;

a primary support frame supported by the base frame, the primary support frame comprising:

a head column that is extendable upward in a vertical direction from a head portion of the base frame;

a foot column spaced apart from the head column, the foot column is extendable upward in the vertical direction from a foot portion of the base frame, wherein the head column and the foot column are each independently actuable to raise and lower in the vertical direction with respect to the base frame;

a longitudinal frame supported by the primary support frame and extending in a longitudinal direction, the longitudinal frame comprising a first side rail and a second side rail, the first and second side rails spaced apart and parallel to each other; and a support pad assembly supported on the longitudinal frame, the support pad assembly comprising:

one or more first clamps that couple to the first side rail via a first clamping feature and one or more second clamps that couple to the second side rail via a second clamping feature, each of the one or more first clamps and the one or more second clamps comprising:

a first actuator actuable to extend in a first direction that is orthogonal to the longitudinal direction, and a second actuator actuable to extend in a second direction that is orthogonal to the longitudinal direction and the first direction, and a support pad comprising a pad hinge about which the support pad is folded, the pad hinge dividing the support pad into a first section and a second section, wherein:

the first section of the support pad is coupled to the first actuator of the one or more first clamps and pivotably coupled to the second actuator of the one or more first clamps via a first link arm, the second section of the support pad is coupled to the first actuator of the one or more second clamps and pivotably coupled to the second actuator of the one or more second clamps via a second link arm, and the first and second actuators of the one or more first clamps and the one or more second clamps, when extended, raise the first section or the second section of the support pad about the pad hinge relative to the longitudinal frame and when retracted, lower the first section or the second section of the support pad about the pad hinge relative to the longitudinal frame.

* * * * *